United States Patent
Sasaki et al.

(10) Patent No.: US 7,605,874 B2
(45) Date of Patent: Oct. 20, 2009

(54) LIQUID CRYSTAL DISPLAY DEVICE AND METHOD OF MANUFACTURING THE SAME

(75) Inventors: Takahiro Sasaki, Kawasaki (JP); Kazuya Ueda, Kawasaki (JP); Yukiko Toyooka, Kawasaki (JP); Jin Hirosawa, Kawasaki (JP); Hideaki Tsuda, Kawasaki (JP)

(73) Assignees: Fujitsu Limited, Kawasaki (JP); AU Optronics Corporation, Hsinchu (TW)

( * ) Notice: Subject to any disclaimer, the term of this patent is extended or adjusted under 35 U.S.C. 154(b) by 706 days.

(21) Appl. No.: 10/948,698

(22) Filed: Sep. 23, 2004

(65) Prior Publication Data

US 2005/0162576 A1    Jul. 28, 2005

(30) Foreign Application Priority Data

Jan. 22, 2004   (JP)   ............... 2004-014397

(51) Int. Cl.
G02F 1/133    (2006.01)
(52) U.S. Cl. .......................... 349/33; 349/34
(58) Field of Classification Search ............ 349/33, 349/34, 43, 129, 139, 156
See application file for complete search history.

(56) References Cited

U.S. PATENT DOCUMENTS

| | | | |
|---|---|---|---|
| 6,201,592 B1 * | 3/2001 | Terashita et al. ............ 349/156 |
| 6,535,260 B1 | 3/2003 | Tasaka et al. | |
| 6,859,248 B2 | 2/2005 | Matsumoto et al. | |
| 6,897,924 B2 | 5/2005 | Tashiro et al. | |
| 6,922,219 B2 * | 7/2005 | Jin et al. .................... 349/113 |
| 7,227,608 B2 | 6/2007 | Matsumoto et al. | |
| 2002/0159018 A1 | 10/2002 | Kataoka et al. | |
| 2002/0171792 A1 | 11/2002 | Kubota et al. | |
| 2003/0048401 A1 | 3/2003 | Hanaoka et al. | |
| 2003/0058374 A1 | 3/2003 | Takeda et al. | |

FOREIGN PATENT DOCUMENTS

| | | |
|---|---|---|
| JP | 11-95221 | 4/1999 |
| JP | 2947350 | 7/1999 |
| JP | 2000-214443 | 8/2000 |
| JP | 2001-066583 | 3/2001 |
| JP | 2002-23179 | 1/2002 |
| JP | 2002-107730 | 4/2002 |
| JP | 2002-357830 | 12/2002 |
| JP | 2003-156731 | 5/2003 |
| KR | 2000-0011246 | 2/2000 |
| KR | 2000-0032071 | 6/2000 |
| KR | 2003-047851 | 6/2003 |

* cited by examiner

*Primary Examiner*—David Nelms
*Assistant Examiner*—David Y Chung
(74) *Attorney, Agent, or Firm*—Greer, Burns & Crain, Ltd.

(57) ABSTRACT

A polyimide film is formed in only the peripheries of picture elements defined by gate bus lines and data bus lines. The areas where the polyimide film is formed have higher thresholds of transmittance-voltage (T-V) characteristics than the areas without polyimide films. Discolor can be suppressed by providing a plurality of areas having different T-V characteristics within each picture element as described above.

5 Claims, 29 Drawing Sheets

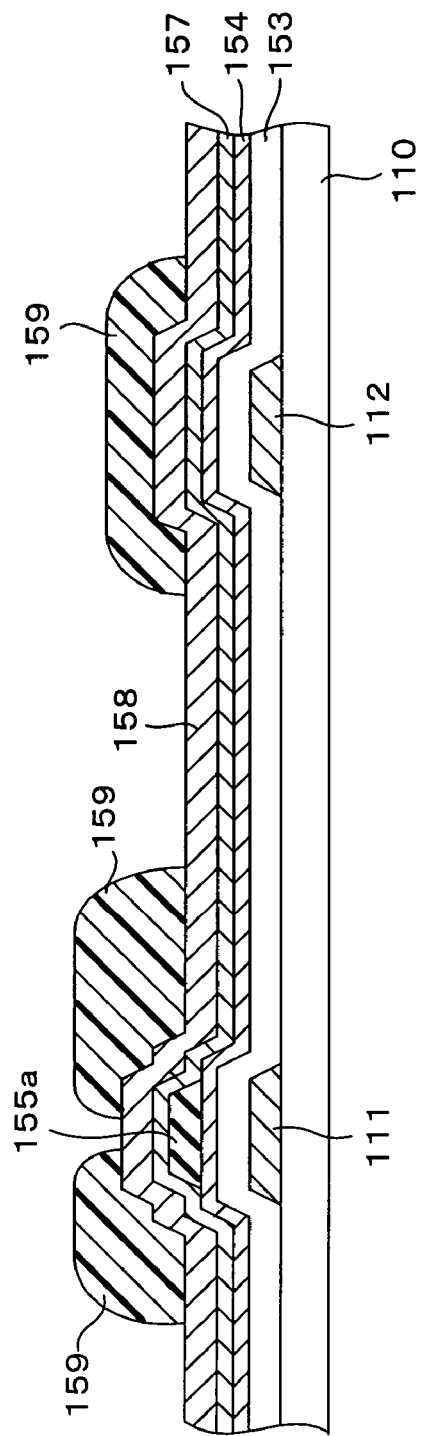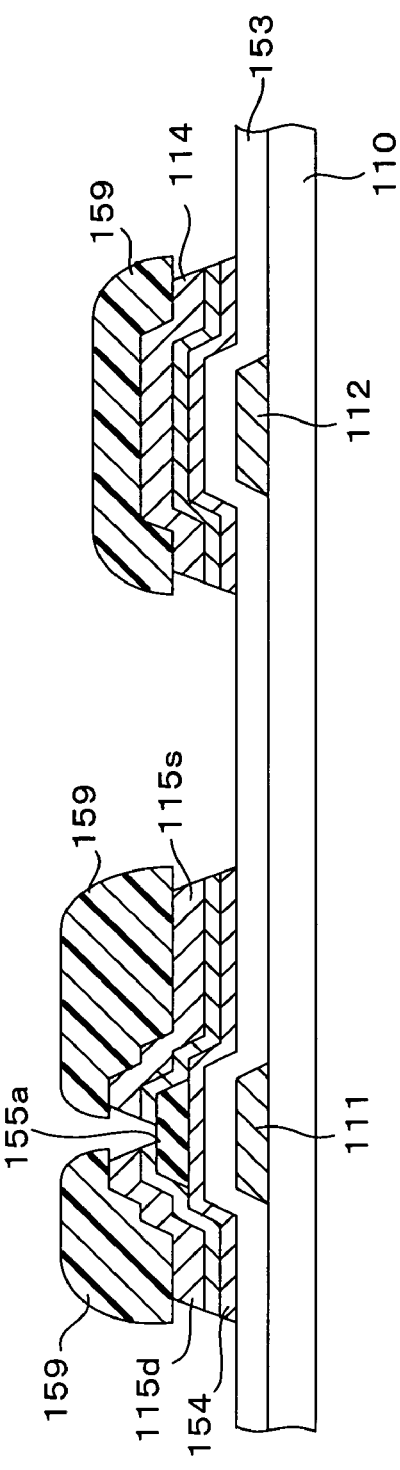

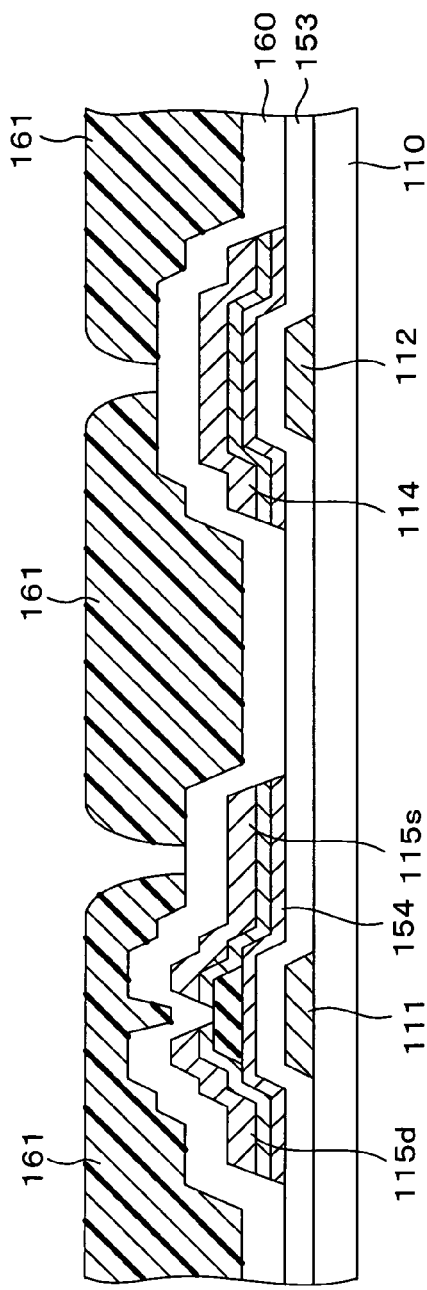
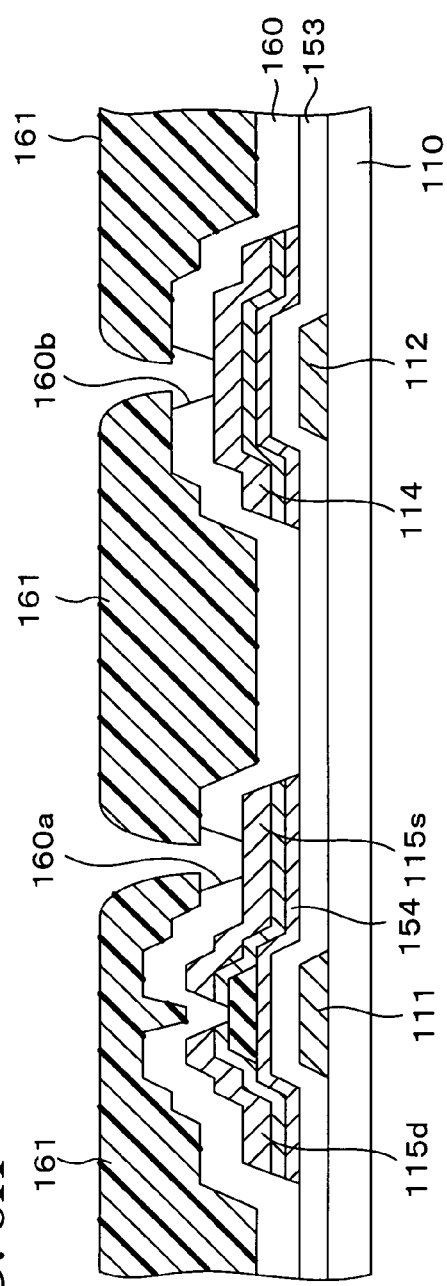

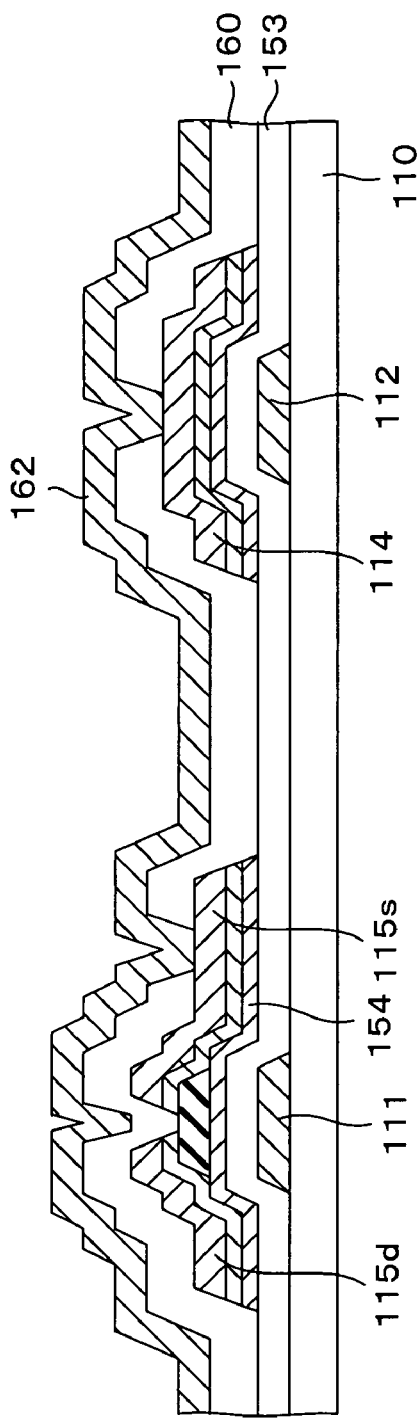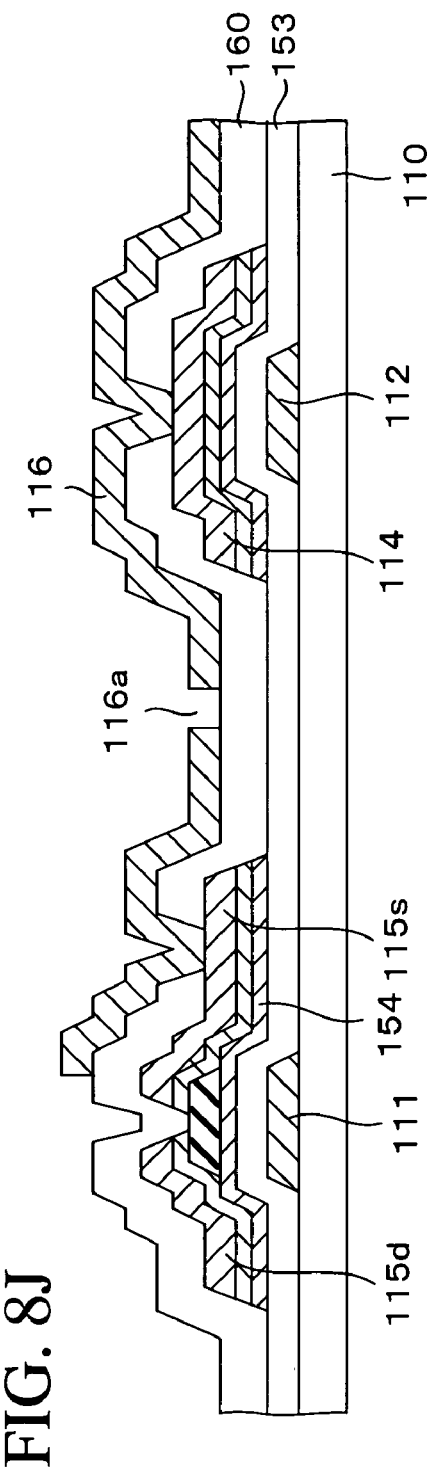

One Pixel Element

LIQUID CRYSTAL DISPLAY DEVICE AND METHOD OF MANUFACTURING THE SAME

CROSS-REFERENCE TO RELATED APPLICATIONS

This application is based on and claims priority of Japanese Patent Application No. 2004-014397 filed on Jan. 22, 2004, the entire contents of which are incorporated herein by reference.

BACKGROUND OF THE INVENTION

1. Field of the Invention

The present invention relates to a liquid crystal display device suppressing a phenomenon in which tone representation and color representation change depending on whether a screen is viewed from the front thereof or from an oblique direction, and relates to a method of manufacturing the same.

2. Description of the Prior Art

FIG. 1 is a plan view showing a picture element part of a conventional multi-domain vertical alignment (MVA) type liquid crystal display device, and FIG. 2 is a schematic cross-sectional view showing part of a picture element of the same (Japanese Patent Publication No. 2947350, Laid-open Japanese Unexamined Patent Publication No. 2002-107730, and the like). Specifically, liquid crystal display devices include a transmissive type liquid crystal display device in which a backlight is used as a light source and in which display is performed by use of light passing through a liquid crystal panel, a reflective type liquid crystal display device in which display is performed by use of the reflection of outside light (natural light or lamplight), and a semi-transmissive type liquid crystal display device in which display is performed by use of a backlight where it is dark and by use of the reflection of outside light where it is bright. Here, a transmissive type liquid crystal display device will be described.

As shown in these FIGS. 1 and 2, an MVA type liquid crystal display device has a liquid crystal panel 40, and two polarizing plates 41a and 41b placed in such a manner that the liquid crystal panel 40 is interposed therebetween. The liquid crystal panel 40 is constituted of a pair of substrates 10 and 20 and a liquid crystal layer 30 made of vertical alignment liquid crystal (liquid crystal with negative dielectric anisotropies) filling the space between the substrates 10 and 20. Generally, thin transparent glass plates are used as the substrates 10 and 20.

As shown in FIG. 1, on one substrate 10 (on the surface thereof which faces the liquid crystal layer 30), a plurality of gate bus lines 11 horizontally extending and a plurality of data bus lines 13 vertically extending are formed at predetermined intervals, respectively. Each of a plurality of rectangular areas defined by these gate and data bus lines 11 and 13 is a picture element area. Moreover, on the substrate 10, auxiliary capacitance bus lines 12 across the centers of the respective picture element areas are formed parallel to the gate bus lines 11.

Each picture element area is provided with an auxiliary capacitance electrode 14, a thin film transistor (TFT) 15 which functions as a switching element, and a picture element electrode 16 made of transparent conductive material, such as Indium-Tin Oxide (ITO).

In this liquid crystal display device shown in FIGS. 1 and 2, part of the gate bus lines 11 are used as the gate electrodes of the TFTs 15. The drain electrode of TFT 15 is connected to the data bus line 13, and the source electrode thereof is connected to the picture element electrode 16. Moreover, the auxiliary capacitance electrode 14 is formed between the auxiliary capacitance bus line 12 and the picture element electrode 16 with first and second insulating films (both are not shown) interposed therebetween, respectively. The auxiliary capacitance electrode 14 is electrically connected to the picture element electrode 16 through a contact hole provided in the second insulating film.

In picture element electrode 16, a comb-shaped slit 16a for domain regulation is provided. This comb-shaped slit 16a includes, for example, a main slit having a width of approximately 10 μm which diagonally extends in the picture element area, and fine slits having widths of approximately 3 μm which extend in directions perpendicular to the main slit. Moreover, a vertical alignment film 18 made of polyimide is formed above the substrate 10, and the surfaces of the picture element electrodes 16 are covered with this vertical alignment film 18.

The other substrate 20 (on the surface thereof which faces the liquid crystal layer 30) is subject to formation of an opposing electrode (common electrode) 23 made of transparent conductive material, such as ITO, and domain regulation protrusions (so-called bank) 24. As shown in FIGS. 1 and 2, the domain regulation protrusions 24 are placed in portions between the slits 16a of the picture element electrodes 16 and in portions overlapping part of the edges of the picture element electrodes 16 which are positioned in the width direction of the picture element electrodes 16. The surfaces of the opposing electrode 23 and the protrusions 24 are covered with a vertical alignment film 28 made of polyimide.

Hereinafter, the substrate 10 on which the TFTs 15, the picture element electrodes 16, and the like are formed is referred to as a TFT substrate, and the substrate 20 on which the common electrode 23 and the like are formed and which is placed to be opposed to the TFT substrate is referred to as an opposing substrate.

Specifically, though not shown in FIGS. 1 and 2, a black matrix for shading areas between the picture elements and TFT-forming areas is formed on at least one of the TFT and opposing substrates. Moreover, in the case of a color liquid crystal display device, a color filter is formed on at least one of the TFT and opposing substrates.

In the liquid crystal display device thus constructed, in the state where a voltage is not applied, the liquid crystal molecules between the picture element electrode 16 and the opposing electrode 23 are aligned with the direction perpendicular to the surfaces of the substrates. In this case, light entering the liquid crystal layer 30 through the polarizing plate 41a from the bottom of the TFT substrate (substrate 10) passes through the liquid crystal layer 30 without change in the polarization direction thereof, and blocked by the polarizing plate 41b on the opposing substrate (substrate 20). That is, this case results in dark display (black display).

On the other hand, when a sufficiently high voltage is applied as a display signal to a data bus line 13 and a scan signal is supplied to a gate bus line 11, the TFT 15 is turned on, and the display signal is written to the picture element electrode 16 and the auxiliary capacitance electrode 14. Thus, the liquid crystal molecules between the picture element electrode 16 and the opposing electrode 23 are aligned with the direction perpendicular to the electric field (direction parallel to the surfaces of the substrates), and light entering the liquid crystal layer 30 through the polarizing plate 41a from the bottom of the TFT substrate changes the polarization direction thereof in the liquid crystal layer 30 to pass through the polarizing plate 41b on the opposing substrate. That is, this case results in bright display (white display). A desired image can be displayed on the liquid crystal display device by controlling a voltage applied to the picture element electrode for each picture element.

In an MVA type liquid crystal display device, as described previously, the slits 16a and the protrusions 24 are formed as domain regulation structures. Around the vicinities of these domain regulation structures, the domain regulation structures determine the directions in which the liquid crystal molecules are tilted when voltages are applied to the picture element electrodes 16. That is, since an electric field occurs in oblique directions toward the center of the slit in the edge portion of each slit 16a, the directions in which liquid crystal molecules are tilted are different from each other on opposite sides of each slit 16a. Moreover, in the state where a voltage is not applied, since liquid crystal molecules around the vicinity of protrusion 24 are aligned perpendicular to the surface of the protrusion 24, the alignment directions of the liquid crystal molecules are different from each other on both sides of the protrusion 24. Accordingly, when an electric field occurs between a picture element electrode 16 and the opposing electrode 23, liquid crystal molecules are tilted in different directions on both sides of the protrusions 24. Display performance, particularly viewing angle characteristics, is significantly improved by providing, within each picture element, a plurality of areas (multi-domain) in which alignment directions of liquid crystal molecules are different from each other. In particular, in the case where a large number of fine slits are provided in the picture element electrodes 16 as shown in FIG. 1, the control of liquid crystal molecules is substantially improved, and the effect of further improving response characteristics and viewing angle characteristics can be obtained.

Specifically, in a conventional general liquid crystal display device, after alignment films are formed on the surfaces of TFT and opposing substrates, the space between the TFT and opposing substrates is filled with liquid crystal. On the other hand, in recent years, manufacturing technology in which forming alignment films can be omitted has been proposed by the applicant of the present application. In this technology, the space between TFT and opposing substrates is filled with liquid crystal to which reactive monomers are added, and then the reactive monomers are polymerized, whereby alignment control layers for vertically aligning the liquid crystal molecules are formed on the surfaces of the substrates. Monomers which form alignment control layers for aligning liquid crystal molecules with a fixed direction by polymerization as described above are referred to as monomers having the capability of controlling alignment. Moreover, a liquid crystal display device in which alignment control layers are formed in this way is referred to as an alignment film-less type liquid crystal display device.

Incidentally, in a general liquid crystal display device, in order to specify the directions in which liquid crystal molecules are tilted when a voltage is applied to electrodes, rubbing treatment in which the surfaces of alignment films are rubbed with a cloth of nylon or the like in one direction is performed. However, rubbing treatment has problems such as the occurrence of dust and the breakdown of a TFT due to static electricity. As technology to improve these disadvantages of rubbing treatment, there has been known a method in which monomers added to liquid crystal are solidified to specify the tilt directions of the liquid crystal molecules. This method uses substrates in which vertical alignment films are previously formed on the surfaces thereof. Furthermore, a polymerization component containing bifunctional monomers as a main component is added to liquid crystal, the space between a pair of substrates is filled with the liquid crystal, and light (UV) is applied thereto in the state where a voltage is applied to electrodes, whereby the monomers are solidified to be polymerized. This makes it possible to specify the directions in which the liquid crystal molecules are tilted under the influence of the solidified polymers.

Moreover, the following is described in Laid-open Japanese Unexamined Patent Publication No. Hei 11(1999)-95221: after the space between a pair of substrates is filled with liquid crystal containing light-curing polymeric resin, ultraviolet light is applied thereto from a predetermined direction to form directional alignment films.

Each of the above-described liquid crystal display devices has alignment films. On the other hand, in an alignment film-less liquid crystal display device, alignment films need not be formed on the surfaces of substrates. Moreover, a polymerization component containing monofunctional monomers as a main component are used as a polymerization component, and light (UV) is applied in the state where a voltage is not applied to electrodes, whereby polymer layers are formed on the surfaces of substrates to vertically align liquid crystal molecules.

However, the inventors of the present application consider that the above-described conventional art has the following problem. In other words, in a conventional MVA type liquid crystal display device, there occurs the phenomenon in which tone representation and color representation significantly change depending on whether a screen is viewed from the front thereof (from the direction of the normal to a panel) or from an oblique direction. This phenomenon is called "discolor" because a screen looks whitish when viewed from an oblique direction. Note that this phenomenon occurs not only in MVA type liquid crystal display devices but also in other VA type liquid crystal display devices and twisted nematic (TN) type liquid crystal display devices.

SUMMARY OF THE INVENTION

An object of the present invention is to provide a liquid crystal display device wherein it is possible to suppress the phenomenon (discolor) in which tone representation and color representation change depending on whether a screen is viewed from the front thereof or from an oblique direction and wherein it is possible to further improve display performance, and to provide a method of manufacturing the same.

A liquid crystal display device according to a first invention of the present application includes: first and second substrates placed to be opposed to each other; liquid crystal filling a space between the first and second substrates; a plurality of picture element electrodes for controlling tilt angles of liquid crystal molecules in accordance with applied voltages for respective picture element areas, the plurality of picture element electrodes being formed on any one of the first and second substrates; and an opposing electrode placed to be opposed to the plurality of picture element electrodes, wherein thresholds of transmittance-voltage characteristics in peripheries of the picture element areas are higher than those in centers of the picture element areas.

A method of manufacturing a liquid crystal display device according to a second invention of the present application includes: forming a picture element electrode in each picture element area of a first substrate; forming an opposing electrode being opposed to the picture element electrodes on a second substrate; performing a treatment for increasing thresholds of transmittance-voltage characteristics on peripheries of the picture element areas of at least one of the first and second substrates; and filling a space between the first and second substrates with liquid crystal.

Research of the applicant of the present application has revealed that providing a plurality of areas having different thresholds of T-V characteristics (transmittance-voltage characteristics) within each picture element is effective in suppressing the phenomenon (discolor) in which tone representation and color representation change depending on whether a screen is viewed from the front thereof or from an oblique direction.

In Laid-open Japanese Unexamined Patent Publication No. 2003-156731, the applicant of the present application has disclosed a liquid crystal display device in which a plurality of areas having different thresholds of T-V characteristics are provided within each picture element in order to make it possible to enhance the speed of response of intermediate tones by improving the delay of response speed in low-tone display. In this liquid crystal display device, utilizing the fact that a threshold of T-V characteristic changes depending on the presence or absence of a polyimide film, a high-threshold area (area with a polyimide film) and a low-threshold area (area without a polyimide film) are provided within each picture element. However, in order to manufacture a liquid crystal display device in which display performance is more favorable, the arrangement of the high-threshold and low-threshold areas needs to be devised.

The first and second inventions of the present application have been accomplished from such a viewpoint. The thresholds of T-V characteristics (transmittance-voltage characteristics) in the peripheries of the picture element areas are set higher than those in the centers of the picture element areas.

Around each picture element area, there are placed a gate bus line to which a scan signal is supplied and a data bus line to which a display signal is supplied. Electric fields occurring from these bus lines act on liquid crystal molecules existing in the peripheries of the picture element areas to cause the phenomenon (so-called crosstalk) by which display quality is deteriorated. However, in the first and second inventions of the present application, the thresholds of T-V characteristics in the peripheries of the picture element areas are set high by a method, in which a polyimide film or the like is selectively formed in the peripheries of the picture element areas, and so on. This makes it possible to suppress not only the phenomenon (discolor) in which tone representation and color representation change depending on whether a screen is viewed from the front thereof or from an oblique direction, but also the influence of crosstalk. As a result, the display quality of the liquid crystal display device is improved.

A liquid crystal display device according to a third invention of the present application includes: first and second substrates placed to be opposed to each other; liquid crystal filling a space between the first and second substrates; a plurality of picture element electrodes for controlling tilt angles of liquid crystal molecules in accordance with applied voltages for respective picture elements, the plurality of picture element electrodes being formed on any one of the first and second substrates; and an opposing electrode placed to be opposed to the plurality of picture element electrodes, wherein areas having higher thresholds of transmittance-voltage characteristics than those of surrounding areas thereof are randomly placed within each picture element area.

A method of manufacturing a liquid crystal display device according to a fourth invention of the present application includes: forming a picture element electrode in each picture element area of a first substrate; forming an opposing electrode being opposed to the picture element electrodes on a second substrate; performing a treatment for changing a threshold of transmittance-voltage characteristics on random positions in the picture element areas of at least one of the first and second substrates; and filling a space between the first and second substrates with liquid crystal.

In the third and fourth inventions of the present application, areas having high thresholds of T-V characteristics are randomly placed within each picture element area. T-V characteristic is changed by the influence of the liquid crystal alignment regulation power of TFT and opposing substrates. In the case where design has been performed in such a manner that areas having different T-V characteristics are placed on specified positions within each picture element, if, for example, displacement occurs when the TFT and opposing substrates are stuck together, the area ratio between high-threshold and low-threshold areas for each domain of an MVA type liquid crystal display device changes to cause the unevenness of display. However, in the case where the high-threshold areas are randomly placed, even if displacement in alignment occurs, the change in the area ratio between the high-threshold and low-threshold areas for each domain becomes small, and the unevenness of display is prevented from occurring.

A liquid crystal display device according to a fifth invention of the present application includes: first and second substrates placed to be opposed to each other; liquid crystal filling a space between the first and second substrates, the liquid crystal having negative dielectric anisotropy; a plurality of picture element electrodes for controlling tilt angles of liquid crystal molecules in accordance with applied voltages for respective picture element areas, the plurality of picture element electrodes being formed on any one of the first and second substrates; an opposing electrode formed on the other one of the first and second substrates to be opposed to the plurality of picture element electrodes; a structure for specifying two or more alignment directions of liquid crystal molecules within each picture element, the structure being formed on at least one of the first and second substrates; and a threshold adjustment dielectric film for selectively increasing a threshold of transmittance-voltage characteristics, the threshold adjustment dielectric film being formed at a position corresponding to the structure.

A method of manufacturing a liquid crystal display device according to a sixth invention of the present application includes: forming a picture element electrode in each picture element area of a first substrate; forming an opposing electrode being opposed to the picture element electrodes on a second substrate; forming, on at least one of the first and second substrates, a structure for specifying two or more alignment directions of liquid crystal molecules within each picture element; performing a treatment for changing a threshold of transmittance-voltage characteristics on an area of at least one of the first and second substrates which corresponds to the structure; and filling a space between the first and second substrates with liquid crystal.

In an MVA type liquid crystal display device, in areas where domain regulation structures, such as protrusions and slits, are formed, it is hard to apply a voltage to liquid crystal molecules. Accordingly, thresholds of T-V characteristics in such areas are higher than those in areas having no such structure. In the fifth and sixth inventions of the present application, polyimide films or the like are formed selectively in areas corresponding to the structures so as to promote this property, thus further increasing the thresholds. This makes it possible to further suppress the phenomenon (discolor) in which tone representation and color representation change depending on whether a screen is viewed from the front thereof or from an oblique direction.

Moreover, in an MVA type liquid crystal display device, in each of the areas adjacent to the structures, electric field distortion when a voltage is applied is large and, particularly in the case where the structure is a protrusion, the threshold of T-V characteristic becomes low compared to those at the centers between the structures because there are initial tilts of liquid crystal molecules. By selectively forming a polyimide film in the areas at the centers between the structures so as to promote this property, it is possible to suppress the phenomenon (discolor) in which tone representation and color representation change depending on whether a screen is viewed from the front thereof or from an oblique direction.

A method of manufacturing a liquid crystal display device according to a seventh invention of the present application includes: forming a picture element electrode in each picture element area of a first substrate; forming an opposing electrode being opposed to the picture element electrodes on a second substrate; performing a treatment for changing surface energy on part of each picture element area of at least one of the first and second substrates; filling a space between the first and second substrates with liquid crystal to which a polymerization component is added; and polymerizing the polymerization component to form alignment control layers on surfaces of the first and second substrates.

A method of manufacturing a liquid crystal display device according to a eighth invention of the present application includes: forming a picture element electrode in each picture element area of a first substrate; forming an opposing electrode being opposed to the picture element electrodes on a second substrate; forming a dielectric film for narrowing a cell gap, in part of each picture element area of at least one of the first and second substrates; filling a space between the first and second substrates with liquid crystal to which a polymerization component is added; and polymerizing the polymerization component to form alignment control layers on surfaces of the first and second substrates.

A method of manufacturing a liquid crystal display device according to a ninth invention of the present application includes: forming a picture element electrode in each picture element area of a first substrate; forming an opposing electrode being opposed to the picture element electrodes on a second substrate; forming a dielectric film in part of each picture element area of at least one of the first and second substrates; filling a space between the first and second substrates with liquid crystal to which a polymerization component is added; and polymerizing the polymerization component to form alignment control layers on surfaces of the first and second substrates, wherein the dielectric film contains a compound which accelerates a reaction of the polymerization component.

Research of the inventors of the present application has revealed that T-V characteristic is also changed by changing the surface energy of a substrate, changing a cell gap, or forming, on the surface of a substrate, a film containing a compound which accelerates the reaction of a polymerization component. By these methods, a plurality of areas having different T-V characteristics can be formed within each picture element, and thus it is possible to suppress the phenomenon (discolor) in which tone representation and color representation change depending on whether a screen is viewed from the front thereof or from an oblique direction.

A method of manufacturing a liquid crystal display device according to a tenth invention of the present application includes: forming a picture element electrode in each picture element area of a first substrate; forming an opposing electrode being opposed to the picture element electrodes on a second substrate; filling a space between the first and second substrates with liquid crystal to which a polymerization component is added and which has negative dielectric anisotropy; and polymerizing the polymerization component by applying light thereto, thus forming, on surfaces of the first and second substrates, alignment control layers for aligning liquid crystal molecules with a direction perpendicular to the surfaces of the substrates, wherein first and second areas having different anchoring energies received by the liquid crystal molecules are formed within each picture element.

T-V characteristic relates to anchoring energies received by liquid crystal molecules. Accordingly, in the case where first and second areas having different anchoring energies received by liquid crystal molecules are formed within each picture element, the T-V characteristic in the first area is different from that in the second area. Thus, it is possible to suppress the phenomenon (discolor) in which tone representation and color representation change depending on whether a screen is viewed from the front thereof or from an oblique direction.

For example, after liquid crystal to which a polymerization component is added is injected into the space between first and second substrates, light is applied to two areas (first and second areas) within each picture element at respective different illuminances. Thus, the anchoring energies of the first and second areas to liquid crystal molecules are made to differ from each other, and two areas having different T-V characteristics are formed within each picture element.

Instead of changing the illuminance of light applied to the first and second areas, surface treatment, such as rubbing treatment, plasma treatment, or excimer UV treatment, may be performed on the first and second areas under respective different conditions. Moreover, a similar effect can also be obtained by applying light to the second area in the state where a voltage different from that applied to liquid crystal when light is applied to the first area is applied to liquid crystal in the second area. Furthermore, a similar effect can also be obtained by applying light to the first and second areas from respective different directions.

A method of manufacturing a liquid crystal display device according to a eleventh invention of the present application includes: filling a space between a first substrate on which a first electrode is formed and a second substrate on which a second electrode is formed with liquid crystal to which a polymerization component is added, wherein a dimmer film in which absorbed amounts of light are different between at least two areas within each picture element is formed on any one of the first and second substrates, and light is applied to the polymerization component in the liquid crystal through the dimmer film to form a plurality of areas having different voltage-transmittance characteristics within each picture element.

In the present invention, a dimmer film in which absorbed amounts of light are different between at least two areas within each picture element is formed on any one of the first and second substrates, and light is applied to the polymerization component in the liquid crystal through this dimmer film. The polymerization state of the polymerization component is changed by the amount of the light. Thus, when light is applied to the polymerization component through the dimmer film as described above, a plurality of areas having different polymerization states are formed within each picture element. Among these areas, T-V characteristics are different from each other. This makes it possible to suppress the phenomenon (discolor) in which a screen looks whitish when viewed from an oblique direction.

A method of manufacturing a liquid crystal display device according to a twelfth invention of the present application includes: filling a space between a first substrate on which a first electrode is formed and a second substrate on which a second electrode is formed with liquid crystal to which a polymerization component is added, wherein a structure for forming a plurality of areas having different cell thicknesses within each picture element is formed on at least one of the first and second substrates, and the polymerization component is polymerized by applying light to a liquid crystal to which the polymerization component is added in a state where a voltage is applied to the first and second electrodes.

In a liquid crystal display device of a type in which the tilt directions of liquid crystal molecules are specified by solidifying monomers added to liquid crystal, as the cell thickness increases, the stability of tilt angles of liquid crystal molecules increases. Accordingly, in the case where a plurality of areas having different thicknesses of a liquid crystal layer are formed within each picture element, T-V characteristics in these areas are different from each other. Thus, it is possible to suppress the phenomenon (discolor) in which tone representation and color representation change depending on whether a screen is viewed from the front thereof or from an oblique direction.

BRIEF DESCRIPTION OF THE DRAWINGS

FIGS. 8A to 8K are cross-sectional views showing a method of manufacturing the liquid crystal display device of the first embodiment in order of steps.

DESCRIPTION OF THE PREFERRED EMBODIMENTS

Hereinafter, embodiments of the present invention will be described with reference to the accompanying drawings.

(1) First Embodiment

Figure 1:
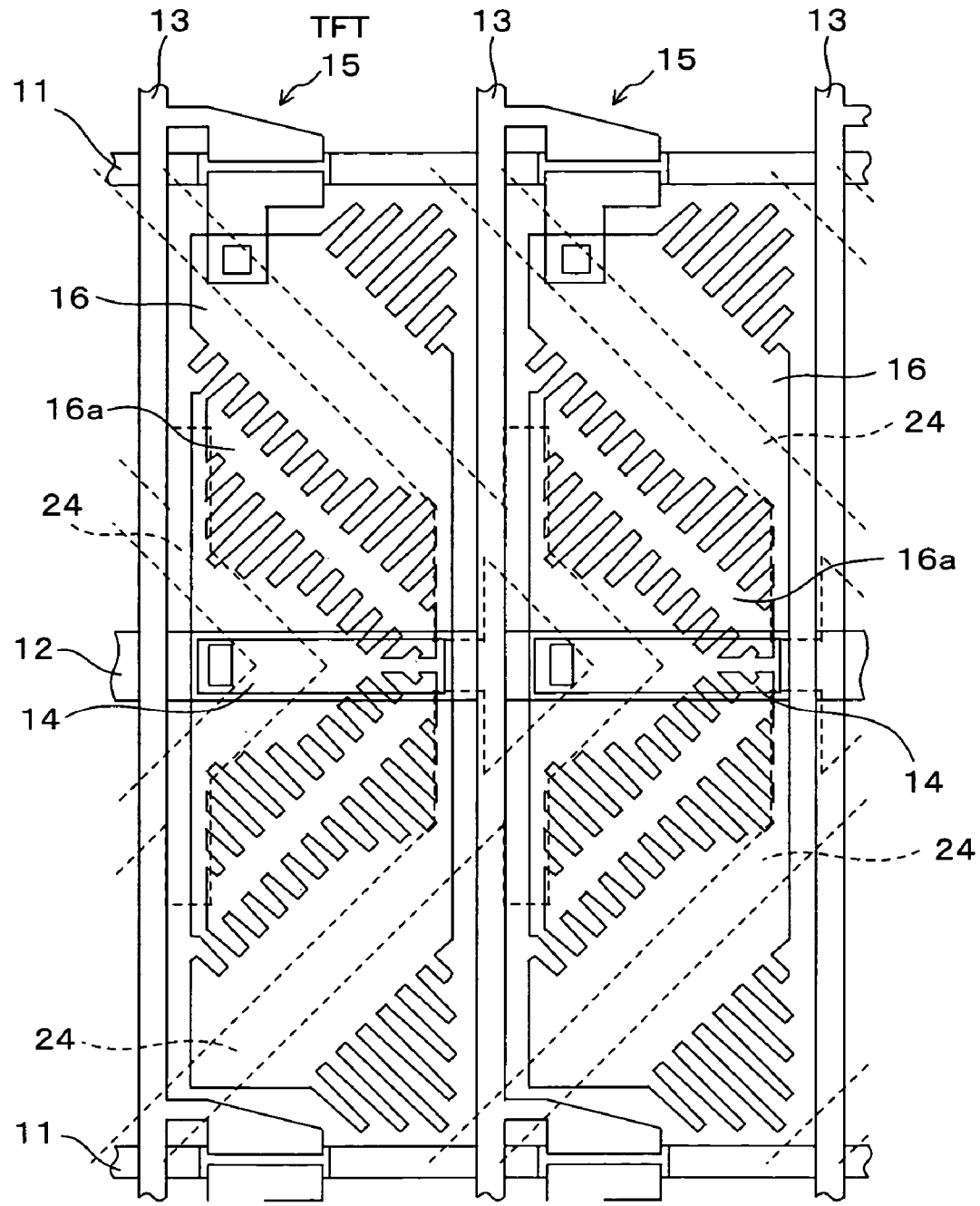
FIG. 1 is a plan view showing a picture element part of a conventional MVA type liquid crystal display device.
Figure 2:
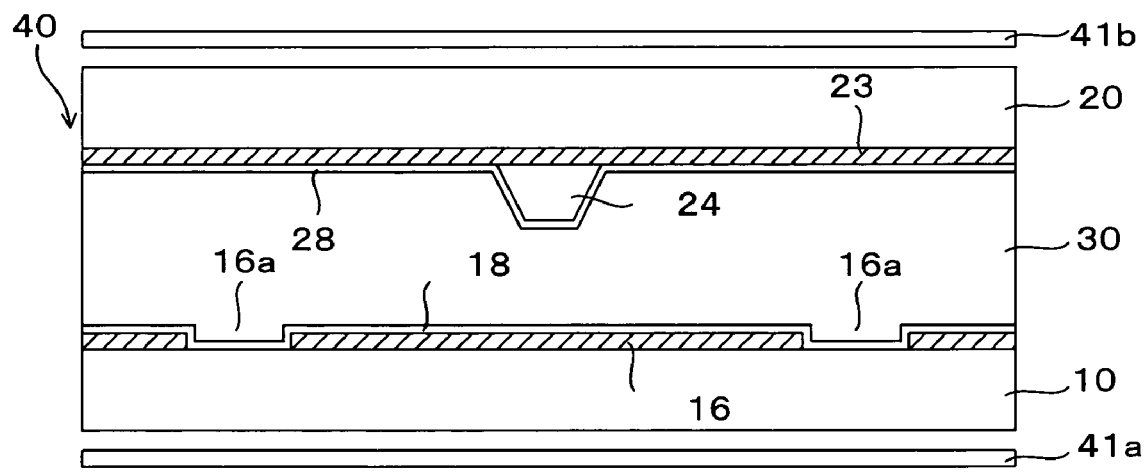
FIG. 2 is a schematic cross-sectional view showing part of a picture element of the conventional MVA type liquid crystal display device.
Figure 3:
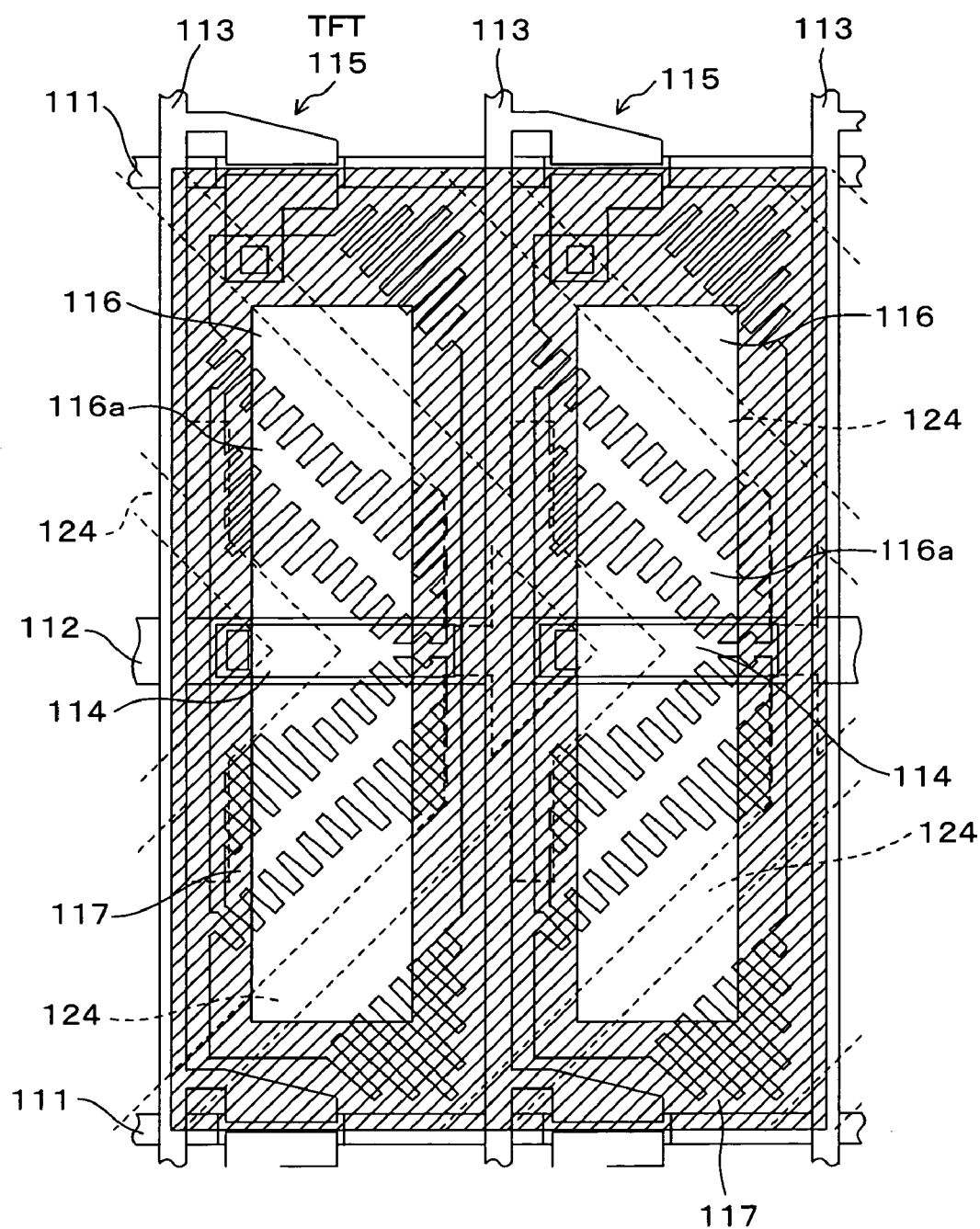
FIG. 3 is a plan view showing a picture element part of a liquid crystal display device (MVA type liquid crystal display device) of a first embodiment of the present invention.
Figure 4:
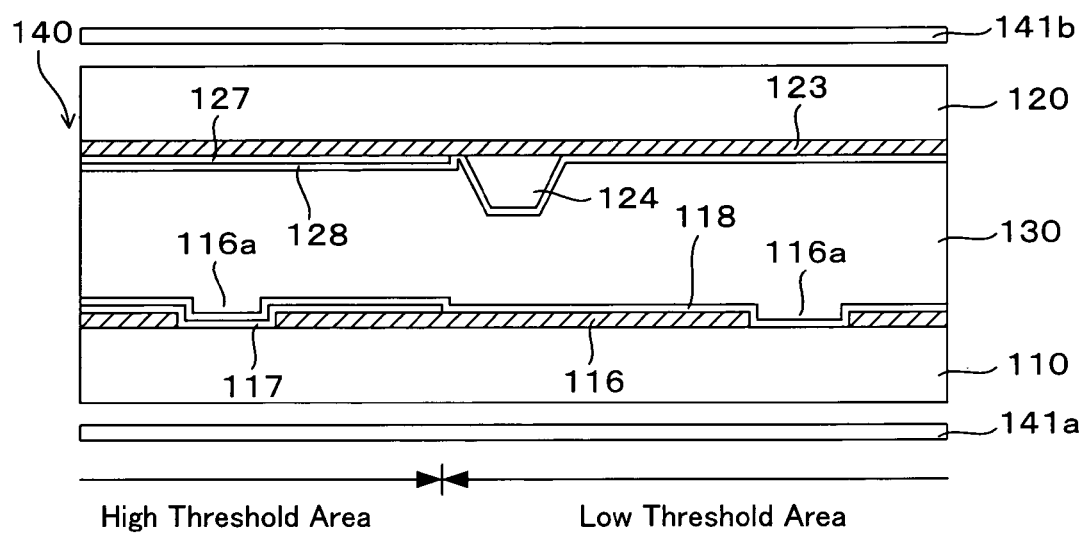
FIG. 4 is a schematic cross-sectional view showing part of a picture element of the liquid crystal display device of the first embodiment.

FIG. 3 is a plan view showing a picture element part of a liquid crystal display device (MVA type liquid crystal display device) of a first embodiment of the present invention. FIG. 4 is a schematic cross-sectional view showing part of a picture element of the same.

As shown in these FIGS. 3 and 4, the liquid crystal display device of the present embodiment includes a liquid crystal panel 140, which includes two glass substrates 110 and 120 and a liquid crystal layer 130 made of vertical alignment liquid crystal (liquid crystal with negative dielectric anisotropy) filling the space between the glass substrates 110 and 120, and two polarizing plates 141a and 141b placed in a manner such that the liquid crystal panel 140 is interposed therebetween.

On the glass substrate 110 (on the surface thereof which is opposed to the liquid crystal layer 130), a plurality of gate bus lines 111 horizontally extending and a plurality of data bus lines 113 vertically extending are formed at predetermined intervals, respectively. Each of a plurality of rectangular areas defined by these gate and data bus lines 111 and 113 is a picture element area. In the present embodiment, picture element areas are horizontally arranged at 99 μm pitch and vertically arranged at 297 μm pitch. Moreover, on the substrate 110, auxiliary capacitance bus lines 112 across the respective centers of the picture element areas are formed parallel to the gate bus lines 111.

Each picture element area is provided with an auxiliary capacitance electrode 114, a TFT 115 which functions as a switching element, and a picture element electrode 116 made of transparent conductive material, such as ITO.

In the liquid crystal display device of the present embodiment, part of each gate bus line 111 is used as the gate electrode of each TFT 115. The drain electrode of each TFT 115 is connected to the data bus line 113, and the source electrode thereof is connected to the picture element electrode 116. Moreover, an auxiliary capacitance electrode 114 is formed between the auxiliary capacitance bus line 112 and the picture element electrode 116 with first and second insulating films (both are not shown) interposed therebetween, respectively. Each auxiliary capacitance electrode 114 is electrically connected to the picture element electrode 116 through a contact hole provided in the second insulating film.

In each picture element electrode 116, a comb-shaped slit 116a for domain regulation is provided. This comb-shaped slit 116a includes, for example, a main slit having a width of approximately 10 μm which diagonally extends in the picture element area, and fine slits having widths of approximately 3 μm which extend in directions perpendicular to the main slit.

Moreover, the liquid crystal display device of the present embodiment is provided with a polyimide film 117 having openings in portions corresponding to the centers of the picture element areas. This polyimide film 117 increases the thresholds of T-V characteristics in areas in the vicinities of the gate and data bus lines 111 and 113 of each picture element. That is, high-threshold areas (hatched areas in FIG. 3) are in accordance with the areas at the peripheries of the picture elements where the polyimide film 117 is formed, and low-threshold areas are in accordance with the areas at the centers of the picture elements where the polyimide film 117 is not formed. In the present embodiment, the size of each opening of the polyimide film 117 is 40 μm×240 μm. Further, the thickness of the polyimide film 117 is equal to or less than 0.1 μm. The surfaces of these high-threshold and low-threshold areas are covered with an alignment control layer 118 formed by polymerizing reactive monomers added to the liquid crystal.

On the other glass substrate 120 (on the surface thereof which faces the liquid crystal layer 130), an opposing electrode (common electrode) 123 made of transparent conductive material, such as ITO or the like, and domain regulation protrusions 124 are formed. As shown in FIGS. 3 and 4, the domain regulation protrusions 124 are placed between the slits 116a of the picture element electrodes 116 and in portions overlapping part of the edges of the picture element electrodes 116 which are located in the width direction of the picture element electrodes 116. Moreover, the opposing electrode 123 is subject thereon to formation of a polyimide film 127 in which openings of 40 μm×240 μm are provided at the centers of the picture elements similarly to the case of the polyimide film 117 on the substrate 110 side. The thickness of this polyimide film 127 is also equal to or less than 0.1 μm. In addition, the surfaces of the opposing electrode 123, the protrusions 124, and the polyimide film 127 are covered with an alignment control layer 128 formed by polymerizing a polymerization component (reactive monomers, oligomers, or polymers) added to the liquid crystal.

Incidentally, in the present embodiment, the polyimide films 117 and 127 are formed on the substrate 110 side and the substrate 120 side in order to adjust the thresholds of T-V characteristics, respectively. However, a polyimide film may be formed on only any one of the substrates. Moreover, instead of a polyimide film, a film made of other material having the property of aligning the liquid crystals with a fixed direction may be formed.

In the liquid crystal display device of the present embodiment configured as described above, in the state where a voltage is not applied, the liquid crystal molecules between the picture element electrode 116 and the opposing electrode 123 are aligned perpendicular to the surfaces of the substrates. In this case, light entering the liquid crystal layer 130 through the polarizing plate 141a from the bottom of the TFT substrate (substrate 110) passes through the liquid crystal layer 130 without change in the polarization direction thereof, and blocked by the polarizing plate 141b on the opposing substrate (substrate 120). That is, this case results in dark display (black display).

On the other hand, when a sufficiently high voltage is applied as a display signal to a data bus line 113 and a scan signal is supplied to a gate bus line 111, the TFT 115 is turned on, and the display signal is written to the picture element electrode 116 and the auxiliary capacitance electrode 114. Thus, the liquid crystal molecules between the picture element electrode 116 and the opposing electrode 123 are aligned with the direction perpendicular to the electric field (direction parallel to the surfaces of the substrates), and light entering the liquid crystal layer 130 through the polarizing plate 141a from the bottom of the TFT substrate changes the polarization direction thereof in the liquid crystal layer 130 to pass through the polarizing plate 141b on the opposing substrate. That is, this case results in bright display (white display). A desired image can be displayed on the liquid crystal display device by controlling a voltage applied to the picture element electrode for each picture element.

Incidentally, the directions in which the liquid crystal molecules are tilted by the electric field become opposite on opposite sides of alignment regulation structures (slits 116a and protrusions 124), thus achieving multi-domain. This provides favorable viewing angle characteristics.

In the liquid crystal display device of the present embodiment, two areas having different thresholds of T-V characteristics are provided in each picture element area. Accordingly, it is possible to suppress the phenomenon (discolor) in which tone representation and color representation change depending on whether a screen is viewed from the front thereof or from an oblique direction. Moreover, in the present embodiment, the periphery of each picture element is subject to arrangement of an area having a high threshold of T-V characteristic, and the center of each picture element is subject to arrangement of an area having a low threshold thereof. Accordingly, it is hard to cause the phenomenon (crosstalk) in which the alignment direction of liquid crystal molecules is changed at the periphery of a picture element area by voltages applied to the gate and data bus lines 111 and 113. These provide the effect of further improving display characteristics of the liquid crystal display device compared to those of a conventional one.

Figure 5:
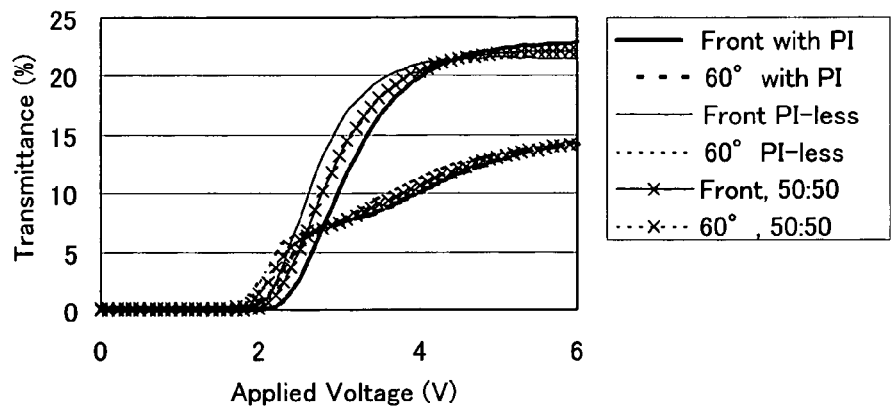
FIG. 5 is a view showing T-V characteristics of liquid crystal display devices of Comparative Examples 1 and 2 and a practical example, when each screen is viewed from the front thereof (from the direction of the normal to each liquid crystal panel), and when each screen is viewed from an oblique direction (direction of the polarization axis, a polar angle of 60°).

FIG. 5 is a view showing T-V characteristics of an MVA type liquid crystal display device (Comparative Example 1: denoted by "with PI" in this drawing) in which a polyimide film is formed on the entire picture element areas, an MVA type liquid crystal display device (Comparative Example 2: denoted by "PI-less" in this drawing) having no polyimide film, and an MVA type liquid crystal display device (practical example: denoted by "50:50" in this drawing) in which a polyimide film is formed in portions each of which is equivalent to 50% of one picture element area, when screens are viewed from the fronts thereof (direction of the normal to the liquid crystal panel) and when the screens are viewed from an oblique direction (direction of the polarization axis, a polar angle of 60°). Here, the horizontal axis represents applied voltage, and the vertical axis represents transmittance. Moreover, FIG. 6 is a view showing part of FIG. 5 which is enlarged.

Figure 6:
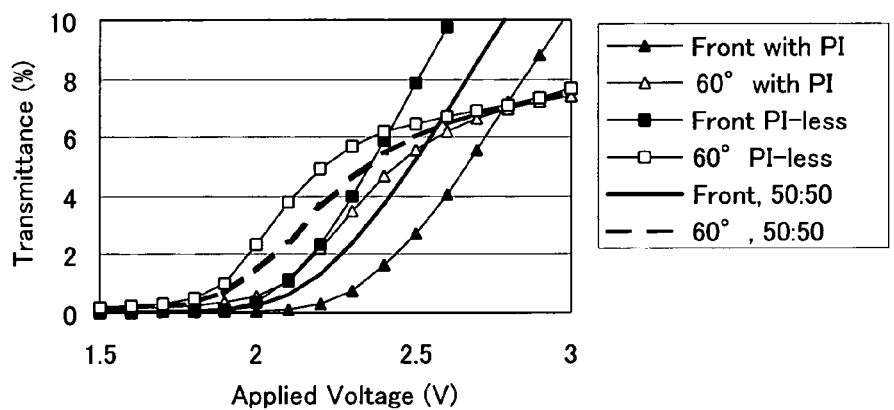
FIG. 6 is a view showing part of FIG. 5 which is enlarged.

From these FIGS. 5 and 6, it can be seen that T-V characteristic, when a screen is viewed from the oblique direction, complexly undulates compared to T-V characteristic when the screen is viewed from the front thereof. Moreover, it can be seen that the thresholds of T-V characteristics are different by approximately 0.2 V between the liquid crystal display device (with PI) of Comparative Example 1 and the liquid crystal display device (PI-less) of Comparative Example 2. Furthermore, it can be seen that, in the liquid crystal display device (50:50) of the practical example, a local undulation of T-V characteristic when the screen is viewed from the oblique direction is small compared to those of Comparative Examples 1 and 2. In particular, in the vicinity of the threshold, transmittance is higher when the screen is viewed from the oblique direction than when the screen is viewed from the front thereof.

Figure 7:
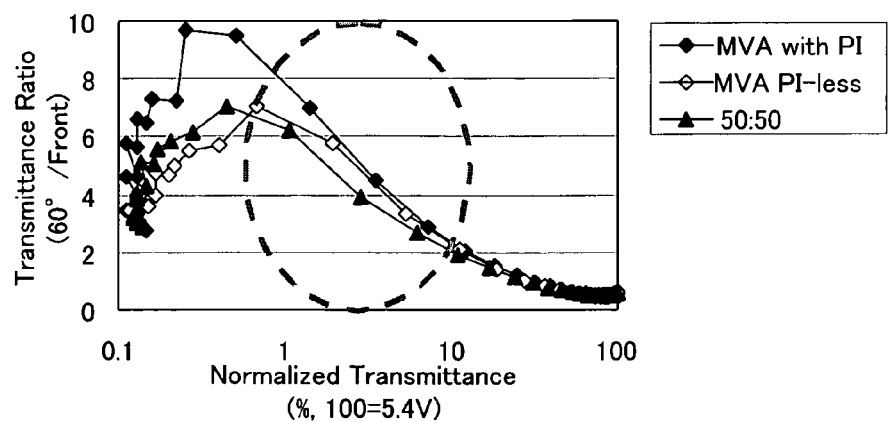
FIG. 7 is a view showing the relationship between normalized transmittances and transmittance ratios of the liquid crystal display devices of the practical example and Comparative Examples 1 and 2.

FIG. 7 is a view showing the relationship between normalized transmittances and transmittance ratios of the liquid crystal display devices of the practical example and Comparative Examples 1 and 2. Here, the normalized transmittance is represented on the horizontal axis, and the transmittance ratio is represented on the vertical axis. Incidentally, a normalized transmittance is a transmittance when a screen is viewed from the front thereof (from the direction of the normal to the liquid crystal panel), and the transmittance when a voltage of 5.4 V is applied to a picture element electrode is set to 100. Moreover, a transmittance ratio is the ratio of the transmittance (60°/front) when the screen is viewed from the oblique direction (direction of the polarization axis, a polar angle of 60°) to the transmittance when the screen is viewed from the front thereof. As this transmittance ratio approaches 1, a local undulation of T-V characteristic becomes small, and the degree of discolor becomes low.

In order to suppress discolor, it is important to allow the transmittance ratio, particularly in the range (portion surrounded by a broken line in the drawing) in which the normalized transmittance is 1 to 10%, to approximate 1. As shown in this FIG. 7, in the liquid crystal display device (50:50) of the practical example, the transmittance ratio when the normalized transmittance is 1 to 10% is close to 1 compared to those of the liquid crystal display devices of Comparative Examples 1 and 2 (with PI and PI-less).

Hereinafter, a method of manufacturing the liquid crystal display device of the present embodiment will be described. To begin with, a method of preparing a TFT substrate will be described with reference to FIGS. 8A to 8K.

Figure 8A:
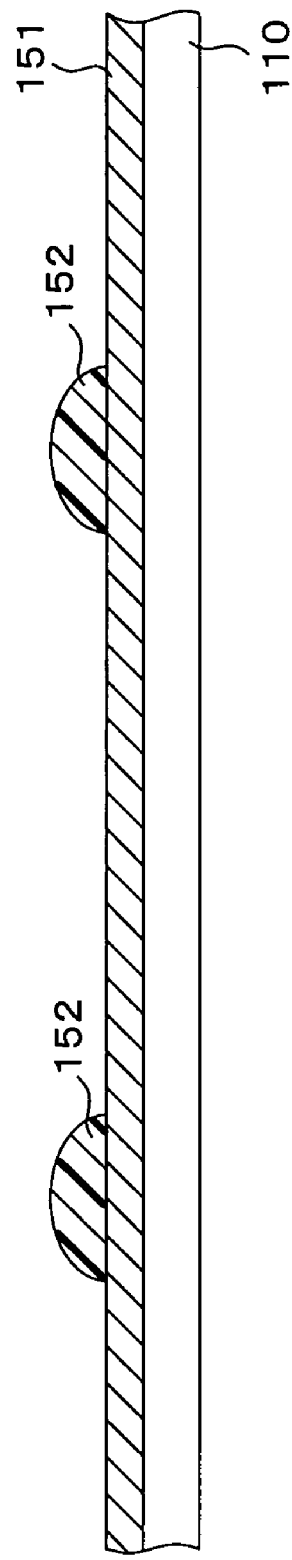

First, as shown in FIG. 8A, a buffer layer (not shown) made of insulating material, such as $SiO_2$, SiN or the like, is formed on a glass substrate 110, and a metal film 151 made of metal, such as Al, Cr or the like, is formed on this buffer layer. Thereafter, photoresist is coated on this metal film 151 to form a photoresist film. Then, the photoresist film is exposed through an exposure mask and developed. Thus, a resist pattern 152 for forming gate bus lines and auxiliary capacitance bus lines is formed.

Figure 8B:
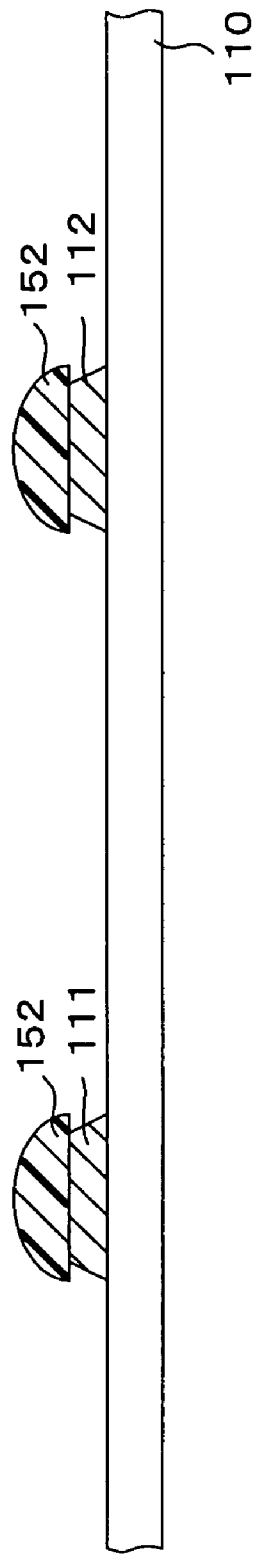

Next, as shown in FIG. 8B, the conductive material film 151 is etched by using the resist pattern 152 as a mask to form gate bus lines 111 and auxiliary capacitance bus lines 112. Thereafter, the resist pattern 152 is removed.

Figure 8C:
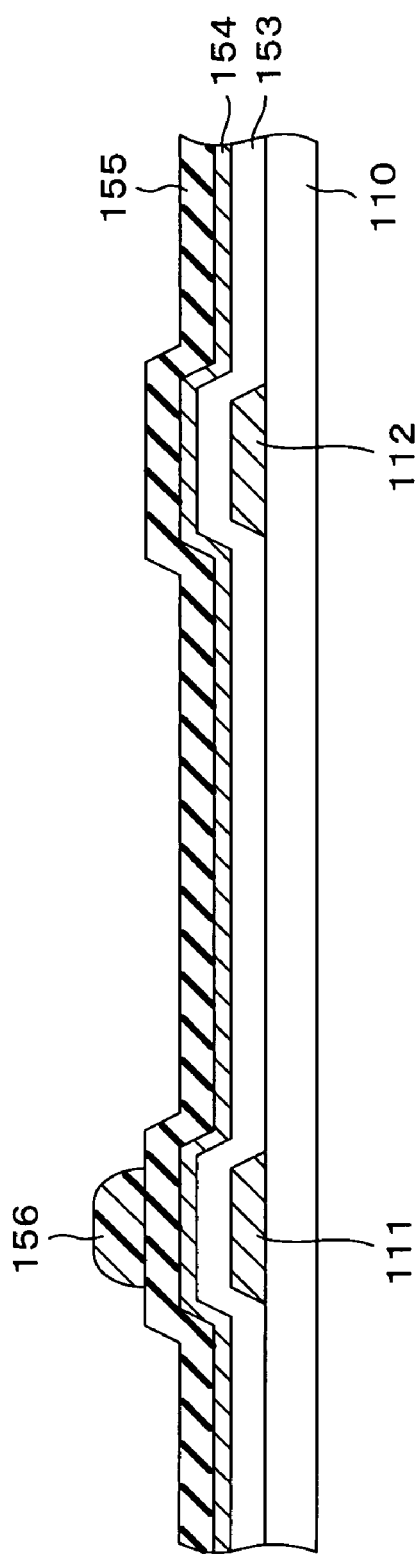

Subsequently, as shown in FIG. 8C, a gate insulating film (first insulating film) 153 made of insulating material, such as $SiO_2$, SiN or the like, is formed on the entire upper surface of the glass substrate 110. After that, a silicon film (amorphous silicon film or polysilicon film) 154 to be active layers of TFTs 115 and a SiN film 155 to be channel protection films are sequentially formed on the gate insulating film 153. Then, a resist pattern 156 for forming channel protection films is formed out of photoresist on predetermined areas (TFT-forming areas) of the SiN film 155.

Figure 8D:
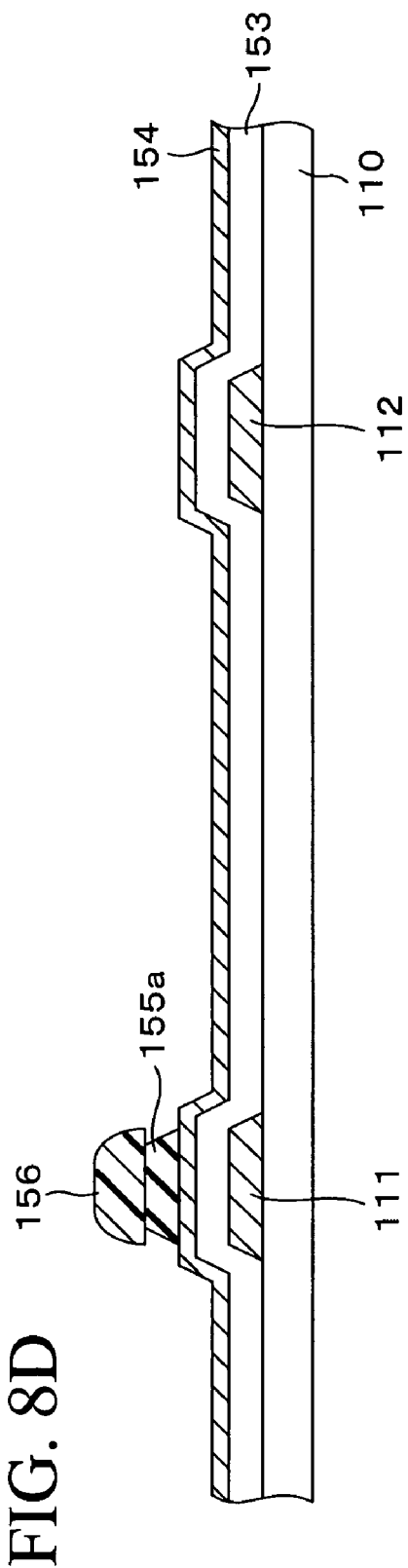

Next, as show in FIG. 8D, using the resist pattern 156 as a mask, the SiN film 155 is etched to form channel protection films 155a. After that, the resist pattern 156 is removed.

Thereafter, as shown in FIG. 8E, a silicon film (silicon film heavily doped with impurities) 157 to be ohmic contact layers is formed on the entire upper surface of the glass substrate 110. On the resultant structure, a metal film 158 is formed of metal such as Al. Then, photoresist is applied to the surface of this metal film 158, exposed, and developed to form a resist pattern 159 for forming data bus lines, source electrodes, drain electrodes, and auxiliary capacitance electrodes.

Next, as shown in FIG. 8F, the metal film 158, the silicon film 157, and the silicon film 154 are etched by using the resist pattern 159 as a mask, thus forming data bus lines 113 (not shown in FIG. 8F), source electrodes 115s, drain electrodes 115d, and auxiliary capacitance electrodes 114. After that, the resist pattern 159 is removed.

Subsequently, as shown in FIG. 8G, an interlayer insulating film (second insulating film) 160 is formed out of insulating material, such as $SiO_2$ or the like, on the entire upper surface of the substrate 110. Then, a photoresist film 161 is formed on this interlayer insulating film 160, exposed, and developed to form openings for forming contact holes. Then, as shown in FIG. 8H, the interlayer insulating film 160 is etched by using the resist film 161 as a mask, thus forming contact holes 160a communicating with the source electrodes 115s and contact holes 160b communicating with the auxiliary capacitance electrodes 114. After that, the resist film 161 is removed.

Next, as shown in FIG. 8I, an ITO film 162 is formed on the entire surface by sputtering or the like. This ITO film 162 is electrically connected to the source electrodes 115s and the auxiliary capacitance electrodes 114 through the contact holes 160a and 160b.

Next, as shown in FIG. 8J, photoresist is applied to the surface of the ITO film 162, and then exposed and developed to form openings of a predetermined pattern. Thus, the photoresist is formed into a resist film (not shown) for forming picture element electrodes. After that, the ITO film 162 is etched by using this resist film as a mask, thus forming picture element electrodes 116 having comb-shaped slits 116a. Then, the resist film for forming picture element electrodes is removed.

Figure 8K:
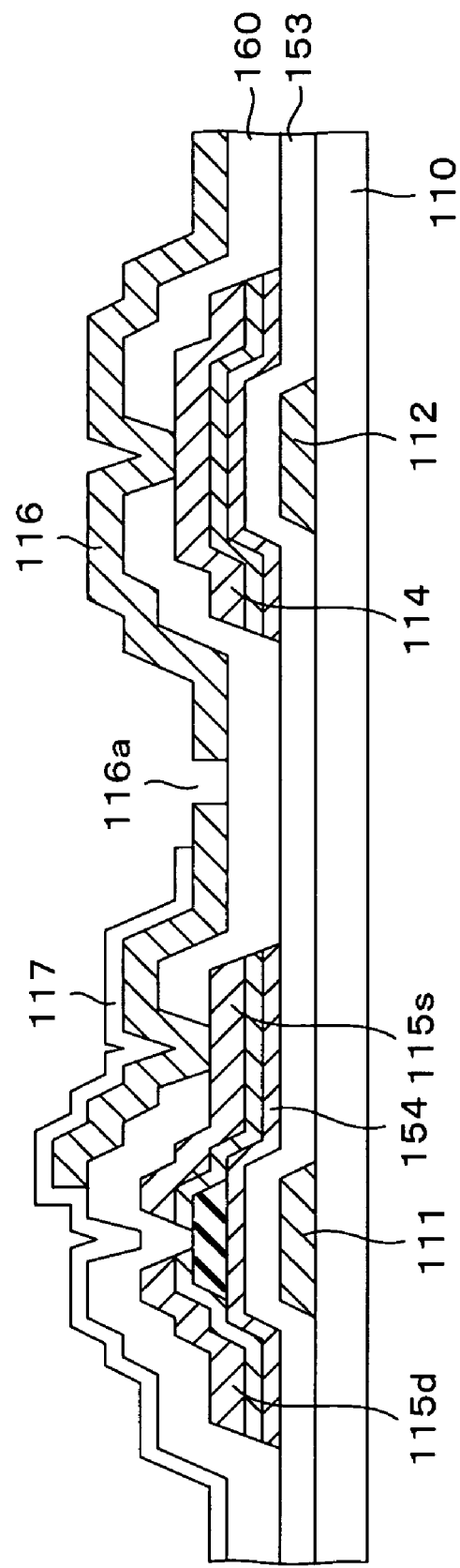

Subsequently, as shown in FIG. 8K, polyimide is applied by letterpress printing to predetermined areas where thresholds are set high, thus forming a polyimide film 117. After that, the resultant structure is baked at a predetermined temperature. Thus, a TFT substrate is completed.

On the other hand, as shown in FIG. 4, a common electrode 123 is formed on a glass substrate 120 and, on the resultant structure, protrusions 124 are formed out of photoresist into a predetermined pattern. Then, polyimide is applied by letterpress printing to predetermined areas where thresholds are set high, thus forming a polyimide film 127. After that, the resultant structure is baked at a predetermined temperature. Thus, an opposing substrate is completed.

After the TFT and opposing substrates have been formed as described above, the space between the substrates is filled with liquid crystal to which reactive monomers having the capability of controlling the alignment of liquid crystals are added. Hereinafter, a method of filling with liquid crystal by vacuum injection will be described.

Figure 9:
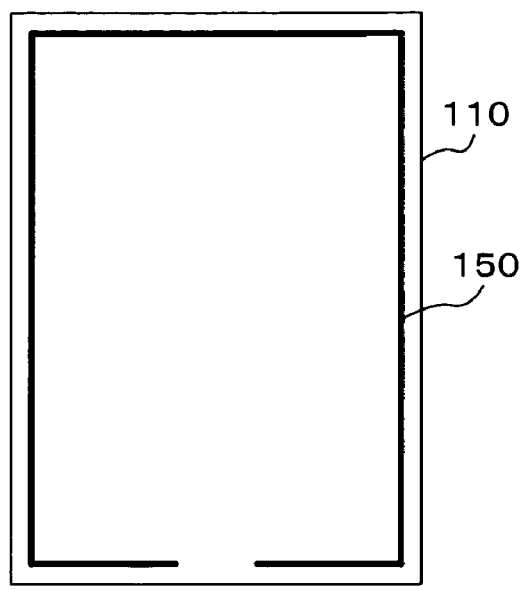
FIG. 9 is a schematic diagram showing a method of filling with liquid crystal by vacuum injection.

First, as shown in FIG. 9, seal material 150 is applied along the periphery of a display area of any one substrate (substrate 110 in FIG. 9) out of the TFT and opposing substrates. At this time, the application of the seal material 150 is performed in a manner such that the seal material 150 is not applied to a portion to be a liquid crystal inlet for injecting liquid crystal in a later step.

Next, spherical spacers having a uniform diameter are scattered on one substrate out of the TFT and opposing substrates, and then the other substrate is adhered thereto, thus forming an empty panel (which is filled with liquid crystal panel before liquid crystal).

On the other hand, preparation is performed for liquid crystal to which reactive monomers having the capability of controlling the alignment of liquid crystals are added at a ratio of several wt %. As the liquid crystal, liquid crystal with negative dielectric anisotropy is used. As the reactive monomers having the capability of controlling the alignment of liquid crystals, for example, photoreactive acrylate having an alkyl side chain or a fluorine group is used. However, the monomers having the capability of controlling the alignment of liquid crystals are not limited to acrylate. Moreover, for the improvement of polymerization or the like, in addition to the reactive monomers having the capability of controlling the alignment of liquid crystals, monomers without the capability of controlling the alignment of liquid crystals or a photopolymerization initiator may be added thereto.

Next, in an evacuated chamber, the liquid crystal inlet of the empty panel is put in the liquid crystal to which the reactive monomers are added, and the pressure in the chamber is brought back to atmospheric pressure. This allows the liquid crystal to enter the panel due to the pressure difference between the inside and outside of the panel. After the inside of the panel has been sufficiently filled with the liquid crystal, the panel is sandwiched between two flat plates to eject redundant liquid crystal, and then the liquid crystal inlet is sealed with resin.

Figure 10:
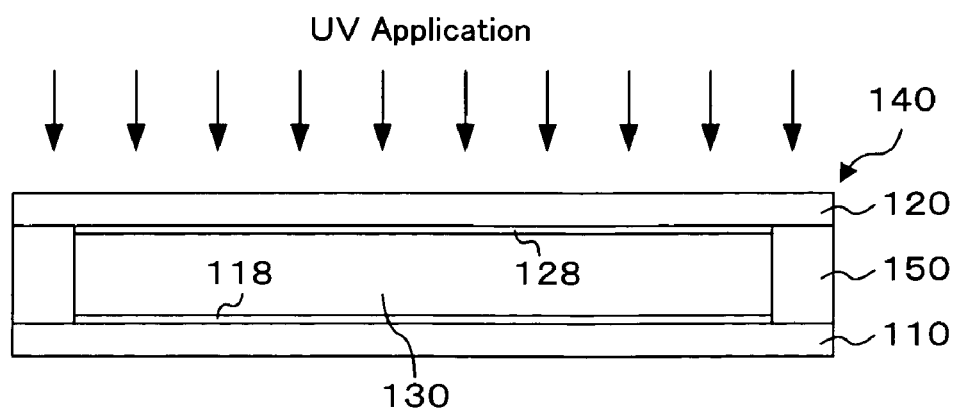
FIG. 10 is a schematic diagram showing the step of forming alignment control layers.

Subsequently, as shown in FIG. 10, ultraviolet light (UV) is applied to the panel 140 filled with the liquid crystal. This causes the reactive monomers to polymerize to form alignment control layers 118 and 128 on the respective surfaces of the TFT and opposing substrates which face the liquid crystal layer 130. The liquid crystal panel prepared as described above is sandwiched between a pair of polarizing plates to complete a liquid crystal display device.

Incidentally, the polyimide films 117 and 127 for adjusting thresholds are formed on both substrates 110 and 120 in the above-described manufacturing method, but a polyimide film may be formed on only any one of the substrates 110 and 120. However, in order to increase the difference between the threshold of high-threshold area and that of low-threshold area, it is preferred that the polyimide films 117 and 127 be formed on both substrates 110 and 120 as described above.

Further, in the aforementioned manufacturing method, the case where the polyimide films 117 and 127 are selectively applied to the surfaces of the substrates 110 and 120 by letterpress printing, has been described. However, the polyimide films 117 and 127 may be selectively applied to the surfaces of the substrates 110 and 120 using an ink jet printer.

Moreover, in the aforementioned embodiment, the case where the polyimide films are formed at only the peripheries of the picture element areas, has been described. However, after the polyimide films have been formed on the respective entire surfaces of the TFT and opposing substrates which face the liquid crystal layer, ultraviolet light (UV) may be selectively applied to the polyimide films through a photomask or the like. In this case, the thresholds (thresholds of T-V characteristics) in the portions irradiated with ultraviolet light are increased. As the ultraviolet light, for example, one with a central wavelength of 254 nm is used, and the irradiation energy is set to 8,000 mJ/cm$^2$.

Furthermore, the polyimide film 127 formed for threshold adjustment has the function of vertically aligning liquid crystal molecules. Accordingly, ultraviolet light irradiation when the alignment control layers 118 and 128 are formed may be selectively performed on the areas having no polyimide films. However, from the viewpoint of simplification of a process, it is preferred that ultraviolet light irradiation is performed on the entire surface of each picture element. Even in the case where ultraviolet light irradiation is thus performed on the entire surface, the thresholds of T-V characteristics in the areas having polyimide films becomes higher than those of the areas having no polyimide films.

In addition, the high-threshold and low-threshold areas can also be formed as follows: irregularities are formed in a manner such that the center of each picture element electrode is higher than the periphery of the picture element electrode, and then a polyimide film is applied to the entire surface and prebaked at a temperature slightly higher than the aforementioned temperature. In this case, the thickness of the polyimide film changes in accordance with the irregularities, and thus the surface energies on the convex portions become lower than those on the concave portions. The prebaking at this time is, for example, performed under conditions where the temperature is 120° C. for one minute.

Hereinafter, description will be performed for the results of actually manufacturing the liquid crystal display device of the present embodiment and investigating display characteristics thereof.

First, two glass substrates (Nippon Electric Glass Co., Ltd.: OA-2) having thicknesses of 0.7 mm were prepared. Then, by the aforementioned method, a black matrix, a color filter, gate and data bus lines, TFTs, and picture element electrodes were formed on one glass substrate to be a TFT substrate in a manner such that the horizontal picture element pitch becomes 99 μm and that the vertical picture element pitch becomes 297 μm. Moreover, an opposing electrode and domain regulation protrusions (bank) were formed on the other glass substrate to be an opposing substrate. The heights of the protrusions are 1.3 μm.

Next, using polyimide material showing a vertical alignment property which is manufactured by JSR Corporation, polyimide films for threshold adjustment were formed on the respective surfaces of the TFT and opposing substrates by letterpress printing. However, the formation of the polyimide films is performed in a manner such that polyimide is prevented from adhering to the center of each picture element area (40 μm×240 μm). After that, prebaking was performed under conditions where the temperature was 80° C. for one minute. Subsequently, main baking was performed under conditions where the temperature was 180° C. for one hour.

Thereafter, the TFT and opposing substrates were adhered to each other with spacers interposed therebetween, thus preparing an empty cell. As the spacers, resin spacers (diameters are 4 μm) manufactured by Sumitomo Fine Chemical Co. were used. Then, this empty cell was filled with liquid crystal to which photoreactive acrylate having an alkyl side chain or a fluorine group is added at a ratio of 2 wt % as reactive monomers for giving the capability of aligning liquid crystals. The liquid crystal was used specifying one with negative dielectric anisotropy which are manufactured by Merck Ltd.

Subsequently, UV light is applied from the opposing substrate side to the liquid crystal panel filled with the liquid crystal adding the reactive monomers, thus polymerizing the monomers to form alignment control layers on the surfaces of the TFT and opposing substrates. The central wavelength of the ultraviolet light of this case is 365 nm, and the irradiation energy is 9,000 mJ/cm².

Two polarizing plates were placed in a manner such that the liquid crystal panel thus manufactured was interposed therebetween. The liquid crystal panel was connected to a driving circuit to drive the liquid crystal panel, and the state of display was investigated. As a result, it has been confirmed that discolor was further suppressed than heretofore, and that there is no deterioration in display quality due to crosstalk.

Incidentally, for comparison, a liquid crystal display device was manufactured in the state where conditions for applying polyimide were reversed. That is, polyimide films were formed in only areas of 40 μm×240 μm at the centers of picture elements, and an MVA type liquid crystal display device was manufactured in the state where other conditions were set equal to the aforementioned ones. Then, the state of display was investigated. As a result, the phenomenon (discolor) in which tone representation and color representation change depending on whether a screen is viewed from the front thereof or from an oblique direction was suppressed, but display failures due to crosstalk were observed at the peripheries of picture elements.

In the above-described embodiment, the description has been performed for the case where the present invention is applied to an MVA liquid crystal display device. However, this is not intended to limit the scope of application of the present invention to an MVA type liquid crystal display device. The present invention can be applied to a VA type liquid crystal display device, a TN type liquid crystal display device, and the like.

(2) Second Embodiment

Figure 11:
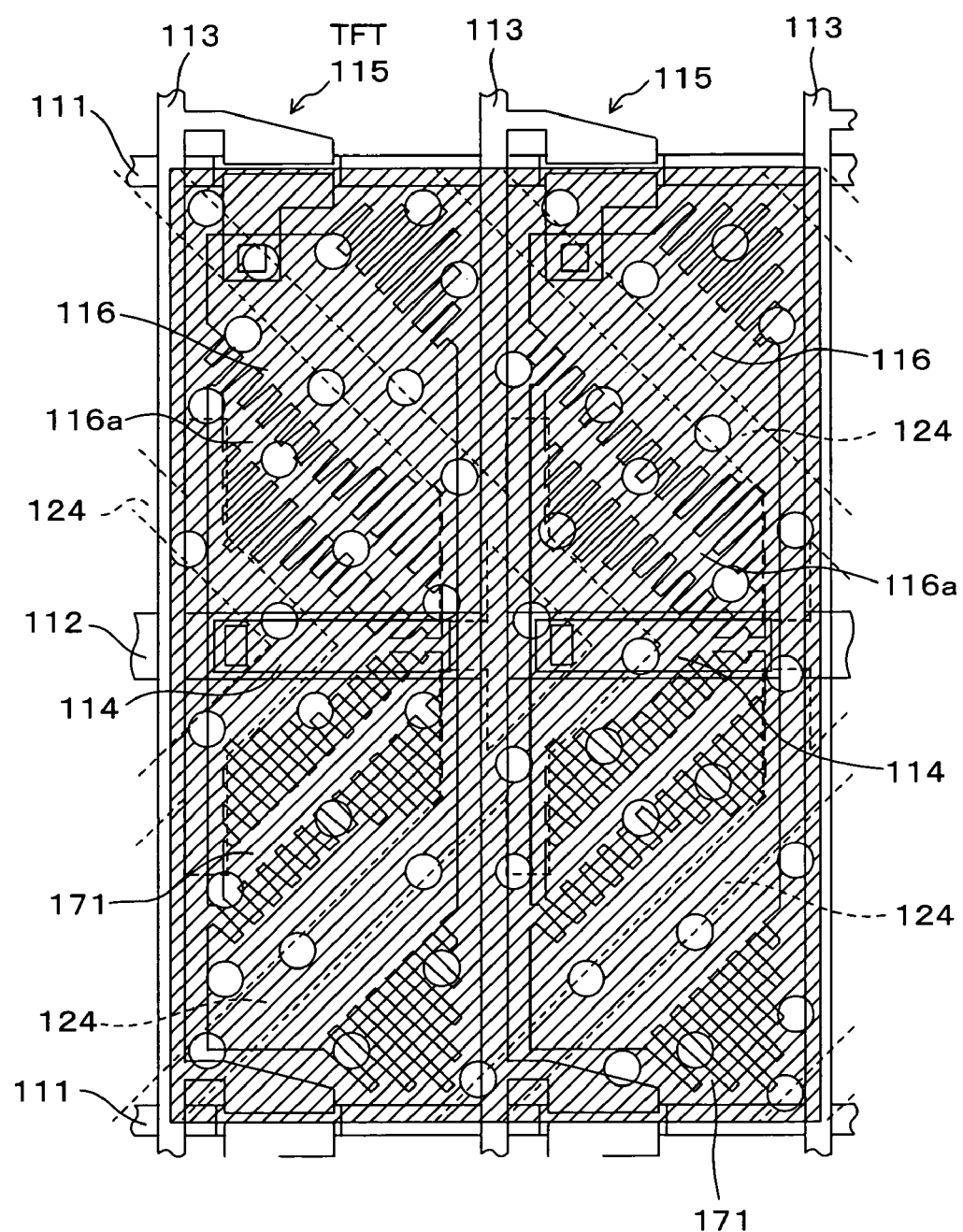
FIG. 11 is a plan view showing a picture element part of a liquid crystal display device of a second embodiment of the present invention.

FIG. 11 is a plan view showing a picture element part of a liquid crystal display device of a second embodiment of the present invention. Incidentally, the present embodiment is different from the first embodiment in that the shapes of openings provided in a polyimide film for adjusting thresholds of T-V characteristics are different therefrom. Other components are basically the same as those of the first embodiment. Accordingly, in FIG. 11, the same components as those shown in FIG. 3 are denoted by the same reference numerals and will not be further described.

In the liquid crystal display device of the present embodiment, openings of a polyimide film 171 for threshold adjustment are randomly placed. T-V characteristic is changed by the influence of the liquid crystal alignment regulation power of TFT and opposing substrates. In the case where design has been performed in a manner such that areas having different T-V characteristics are placed at specified positions within each picture element, if, for example, displacement occurs when the TFT and opposing substrates are aligned with each other, the area ratio between high-threshold and low-threshold areas for each domain changes to cause the unevenness of display. However, in the case where the high-threshold and low-threshold areas are randomly placed as in the present embodiment, even if displacement in alignment occurs, it is possible to avoid the change in the area ratio between the high-threshold and low-threshold areas for each domain, and thus it is possible to prevent the unevenness of display.

The liquid crystal display device of the present embodiment can be manufactured by a method basically similar to that of the first embodiment, except for the fact that the patterns of polyimide films are different therefrom.

Incidentally, by spraying polyimide to be applied, the polyimide can be randomly adhered to the surfaces of the TFT and opposing substrates, and thus a similar effect can be obtained.

(3) Third Embodiment

Figure 12:
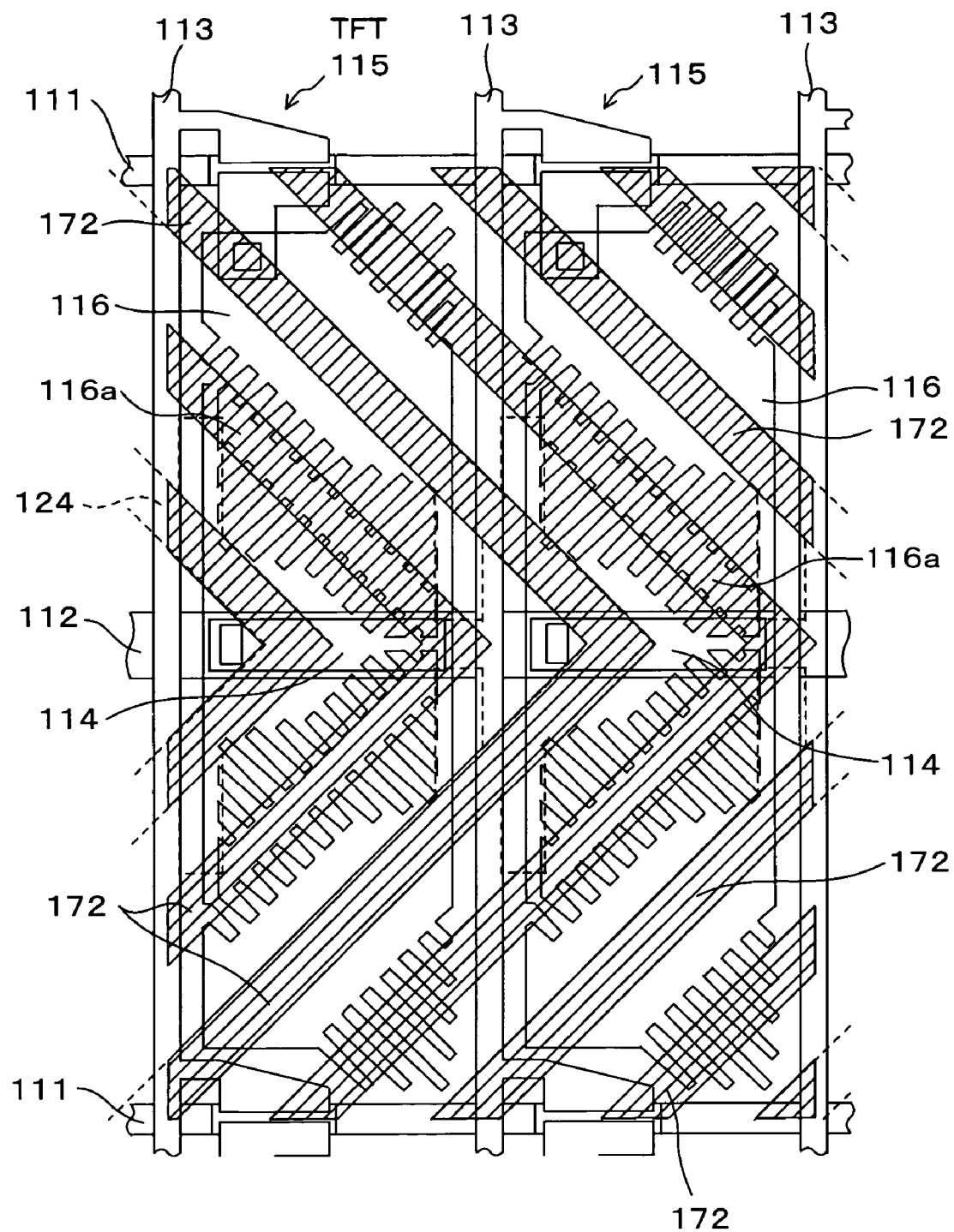
FIG. 12 is a plan view showing a picture element part of a liquid crystal display device of a third embodiment of the present invention.

FIG. 12 is a plan view showing a picture element part of a liquid crystal display device of a third embodiment of the present invention. Incidentally, the present embodiment is different from the first embodiment in that the forming position of a polyimide film for adjusting thresholds of T-V characteristics is different therefrom. Other constituents are basically the same as those of the first embodiment. Accordingly, in FIG. 12, the same components as those shown in FIG. 3 are denoted by the same reference numerals and will not be further described.

In the present embodiment, a polyimide film 172 for adjusting thresholds of T-V characteristics is selectively formed in portions having domain regulation structures, i.e., protrusions 124 and slits 116a. In the areas having the structures, it is originally hard to apply a voltage to liquid crystal molecules, and therefore thresholds of T-V characteristics are higher than those in the areas having no structures. In the present embodiment, polyimide films for adjusting the thresholds are formed in only the areas with the protrusions 124 or the slits 116a so as to promote this property, thus enlarging the difference between the threshold of T-V characteristic in each high-threshold area and that in each low-threshold area which are provided within each picture element. This makes it possible to further reduce the phenomenon (discolor) in which tone representation and color representation change depending on whether a screen is viewed from the front thereof or from an oblique direction.

The liquid crystal display device of the present embodiment can be manufactured by a method basically similar to that of the first embodiment, except for the fact that the patterns of polyimide films are different therefrom. Moreover, the domain regulation structures may be used specifying hollows (grooves) in the surfaces of the substrates other than the above-described protrusions and slits. The present invention can also be applied to the hollows (grooves) provided in the surfaces of the substrates as the domain regulation structures.

(4) Fourth Embodiment

Figure 13:
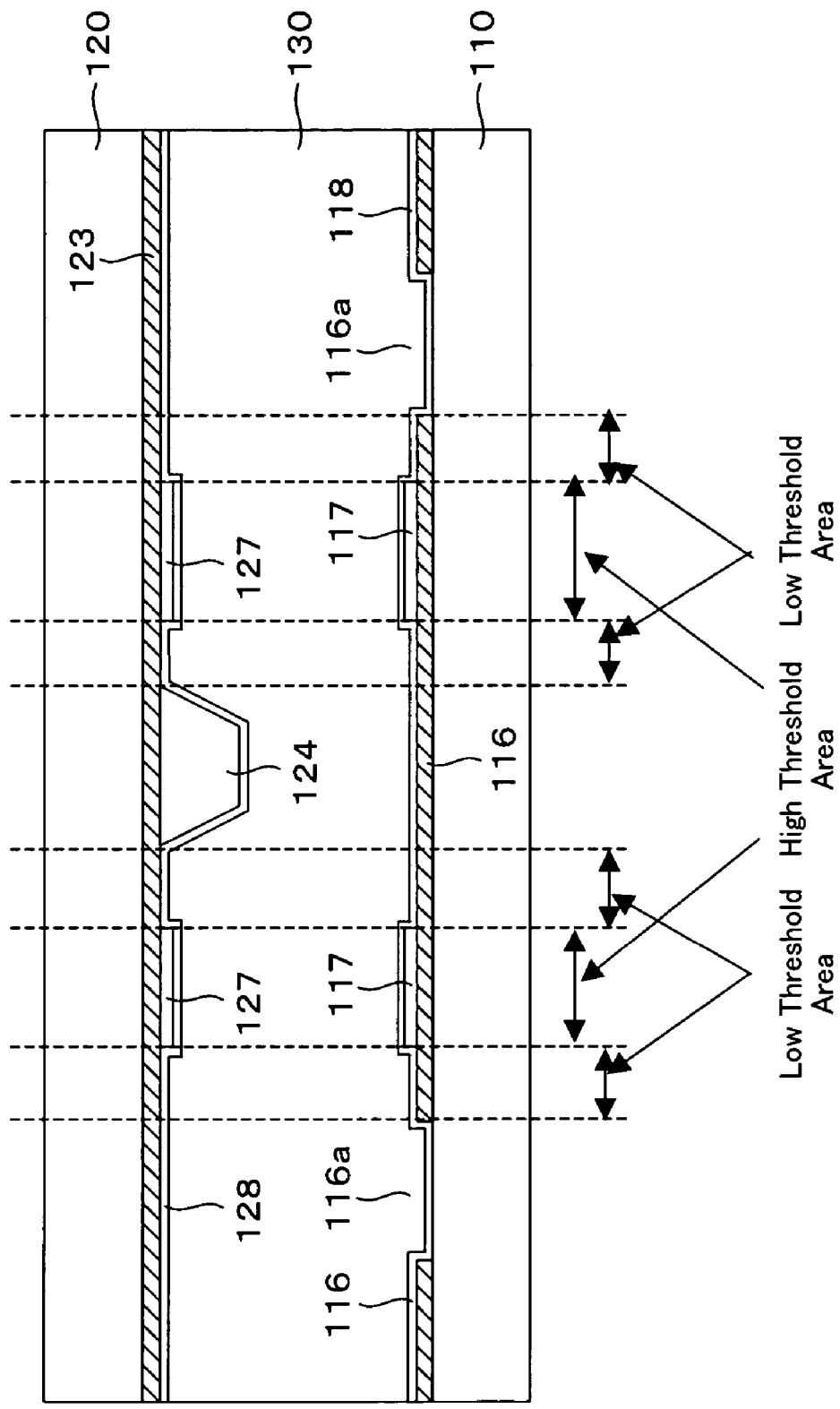
FIG. 13 is a cross-sectional view showing a picture element part of a liquid crystal display device of a fourth embodiment of the present invention.

FIG. 13 is a cross-sectional view showing a picture element part of a liquid crystal display device of a fourth embodiment of the present invention. Incidentally, the present embodiment is different from the first embodiment in that the forming position of a polyimide film for adjusting thresholds of T-V characteristics is different therefrom, and that a slit 116a of each picture element electrode 116 includes only a main slit having a width of 10 μm (i.e., fine slits are not provided). Other constituents are basically the same as those of the first embodiment. Accordingly, in FIG. 13, the same components as those shown in FIG. 4 are denoted by the same reference numerals and will not be further described.

In the present embodiment, polyimide films 117 and 127 for threshold adjustment are formed in only the centers of the areas between structures (protrusions 124 and slits 116a), and polyimide films are not formed in the areas having the structures and the area in the vicinities thereof.

In each of the areas (low-threshold areas in the drawing) adjacent to the areas where the structures are formed, electric field distortion when a voltage is applied is large and, particularly in the case where the structure 124 is a protrusion, the threshold of T-V characteristic becomes low compared to that in the areas (high-threshold areas in the drawing) at the centers between the structures because there are initial tilts of liquid crystal molecules. Accordingly, in the present embodiment, the polyimide films 117 and 127 for threshold adjustment are formed in only the areas at the centers between the structures so as to promote this property, thus much more enlarging the difference between the threshold of T-V characteristic in each high-threshold area and that in each low-threshold area. This makes it possible to further reduce the phenomenon (discolor) in which tone representation and color representation change depending on whether a screen is viewed from the front thereof or from an oblique direction.

In the case of a liquid crystal display device in which fine slits are provided, the areas between structures are narrow. Accordingly, the thresholds in the areas adjacent to the areas where the structures are provided are almost equal to the thresholds in the areas at the centers between the structures, and thus the effect of the present embodiment is reduced. Accordingly, the present embodiment is preferably applied to a liquid crystal display device having no fine slits and having sufficiently wide areas between structures.

The liquid crystal display device according to the present embodiment was actually manufactured. This liquid crystal display device has polyimide films for threshold adjustment in only high-threshold areas. Here, the areas which are 7.5 μm away from structures (protrusions and slits) are low-threshold areas, and the areas which exist at the centers between the structures and which have widths of 15 μm are the high-threshold areas. As a result, it has been confirmed that a threshold of T-V characteristic, which was 0.2 V heretofore, becomes 0.4 V. Moreover, it has also been confirmed that the phenomenon (discolor) in which tone representation and color representation change depending on whether a screen is viewed from the front thereof or from an oblique direction is further reduced.

The liquid crystal display device of the present embodiment can be manufactured by a method basically similar to that of the first embodiment, except for the fact that the patterns of the slits of picture element electrodes are different therefrom and that the patterns of the polyimide films are different therefrom.

(5) Fifth Embodiment

Hereinafter, a fifth embodiment of the present invention will be described.

In each of the aforementioned Laid-open Japanese Unexamined Patent Publication No. 2003-156731 and the first to fourth embodiments, a plurality of areas having different thresholds of T-V characteristics are formed in each picture element using resin (polyimide) having the property of aligning liquid crystal molecules with a fixed direction. However, the research of the inventors of the present application has been revealed that a similar effect can also be obtained by partially changing surface energy within each picture element, changing a cell thickness in part of each picture element, or forming, in part of each picture element, a film made of material to which an initiator for accelerating the reaction of monomers in liquid crystal is added.

Hereinafter, manufacturing examples of liquid crystal display devices of the present embodiment will be described.

MANUFACTURING EXAMPLE 1

Figure 14:
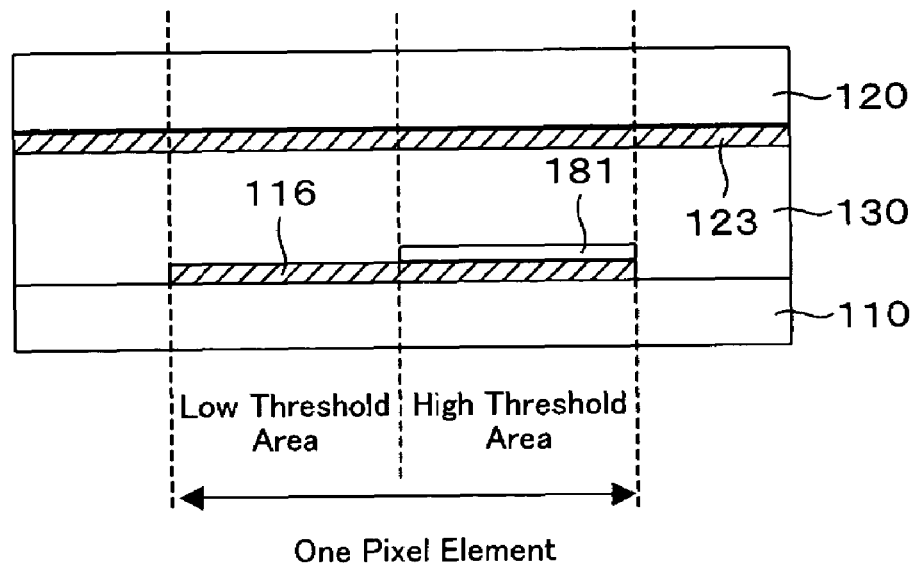
FIG. 14 is a schematic diagram showing a method (first method) of manufacturing a liquid crystal display device of a fifth embodiment of the present invention.

FIG. 14 is a schematic cross-sectional view showing a liquid crystal display device in which two areas having different T-V characteristics are formed within each picture element by partially changing surface energy within each picture element. Referring to this FIG. 14, a method (first method) of manufacturing a liquid crystal display device of the fifth embodiment will be described. Incidentally, in FIG. 14, the same components as those shown in FIG. 4 are denoted by the same reference numerals. Further, in FIG. 14, polarizing plates, alignment control layers, and the like are not shown.

First, two glass substrates 110 and 120 (Nippon Electric Glass Co., Ltd.: OA-2) having thicknesses of 0.7 mm were prepared. Then, picture element electrodes 116 made of ITO were formed on one glass substrate 110, and a common electrode 123 made of ITO was formed on the other glass substrate 120.

Next, photosensitive acrylic resin (manufactured by Nippon Steal Chemical Co., Ltd.: V259PA) was applied on the entire upper surface of the glass substrate 110, thus forming an acrylic resin film having a thickness of 0.1 μm. Then, the acrylic resin film was exposed through an exposure mask in which a predetermined pattern is provided, and then developed, whereby an acrylic resin film 181 covering a portion which is equivalent to 50% of one picture element was formed in each picture element area. This acrylic resin film 181 does not have the property of aligning liquid crystal molecules with a fixed direction. Moreover, the surface energies in the portions where the acrylic resin films 181 are formed become higher than those in portions having no acrylic resin films.

Incidentally, in the above-described example, an acrylic resin film is formed in part of each picture element using photosensitive acrylic resin. However, acrylic resin films may be formed in only predetermined areas by letterpress printing or ink jet printing using acrylic resin which is not photosensitive. Further, though the acrylic resin films 171 are formed on only the glass substrate 110 side in this example, acrylic resin films may also be formed on the glass substrate 120 side.

Subsequently, the glass substrates 110 and 120 were adhered to each other in such a manner that spacers (not shown) having diameters of 4 μm were interposed therebetween, thus preparing an empty cell. The spacers were used specifying resin spacers (diameters are 4 μm) manufactured by Sumitomo Fine Chemical Co. Then, this empty cell was filled with liquid crystal (liquid crystal with negative dielectric anisotropy) to which photoreactive acrylate having an alkyl side chain was added at a ratio of 2 wt % as reactive monomers having the capability of controlling the alignment of liquid crystals. Note that, in addition to the reactive monomers having the capability of controlling the alignment of liquid crystals, monomers without the capability of controlling the alignment of liquid crystals or a photopolymerization initiator may be added thereto.

Subsequently, ultraviolet light was applied to the liquid crystal panel containing the liquid crystal from the substrate 120 side to polymerize the monomers, thus forming alignment control layers (not shown) on the surfaces of the substrates 110 and 120 which face a liquid crystal layer 130. The central wavelength of the ultraviolet light of this case is 365 nm, and the irradiation energy is 9,000 mJ/cm$^2$.

The liquid crystal panel prepared as described above was interposed between two polarizing plates, and driven by a driving circuit. Then, the state of display was investigated. As a result, it has been confirmed that discolor can be suppressed, and that T-V characteristics are different from each other between the areas having the acrylic resin films 181 and the areas having no acrylic resin films.

MANUFACTURING EXAMPLE 2

Figure 15:
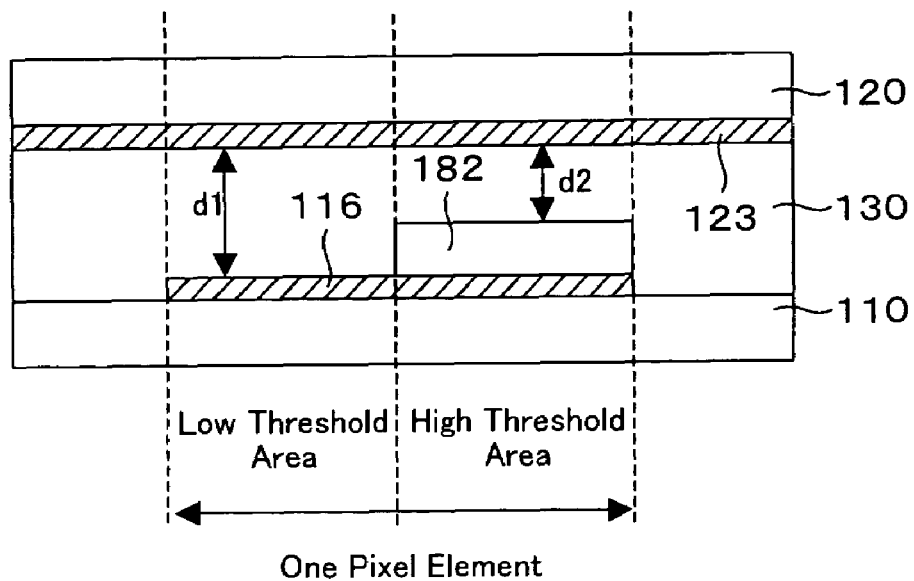
FIG. 15 is a schematic diagram showing a method (second method) of manufacturing a liquid crystal display device of the fifth embodiment of the present invention.

FIG. 15 is a schematic cross-sectional view showing a liquid crystal display device in which two areas having different cell thicknesses are provided in each picture element. Referring to this FIG. 15, a method (second method) of manufacturing a liquid crystal display device of the fifth embodiment will be described. Incidentally, in FIG. 15, the same components as those shown in FIG. 4 are denoted by the same reference numerals. Further, in FIG. 15, polarizing plates, alignment control layers, and the like are not shown.

First, two glass substrates 110 and 120 were prepared. Picture element electrodes 116 made of ITO were formed on one glass substrate 110, and a common electrode 123 made of ITO was formed on the other glass substrate 120.

Next, photoresist was applied to the entire upper surface of the glass substrate 110 to form a photoresist film. Thereafter, the photoresist film was exposed through an exposure mask having a predetermined pattern and then developed to form threshold adjustment films 182 each of which covers an area that is equivalent to 50% of one picture element. In order to change T-V characteristic by the cell thickness, it is preferred that the threshold adjustment films 182 be formed to thicknesses equal to or greater than 0.5 μm. In this example, the thicknesses of the threshold adjustment films 182 are set to 1.5 μm.

Then, the glass substrates 110 and 120 were adhered to each other in a manner such that spacers (not shown) having diameters of 4 μm were interposed therebetween, and the space between the substrates 110 and 120 was filled with liquid crystal to which reactive monomers having the capability of controlling the alignment of liquid crystal were added.

Subsequently, ultraviolet light was applied to the liquid crystal panel containing the liquid crystal from the substrate 120 side to polymerize the monomers, thus forming alignment control layers (not shown) on the surfaces of the substrates 110 and 120 which face a liquid crystal layer 130.

The liquid crystal panel prepared as described above was interposed between two polarizing plates, and driven by a driving circuit. Then, the state of display was investigated. As a result, the following has been confirmed: even in the case where a resin film without the capability of controlling alignment is formed, areas having different thresholds of T-V characteristics can be formed within each picture element area by changing the cell thickness, and thus discolor can be suppressed.

MANUFACTURING EXAMPLE 3

Figure 16:
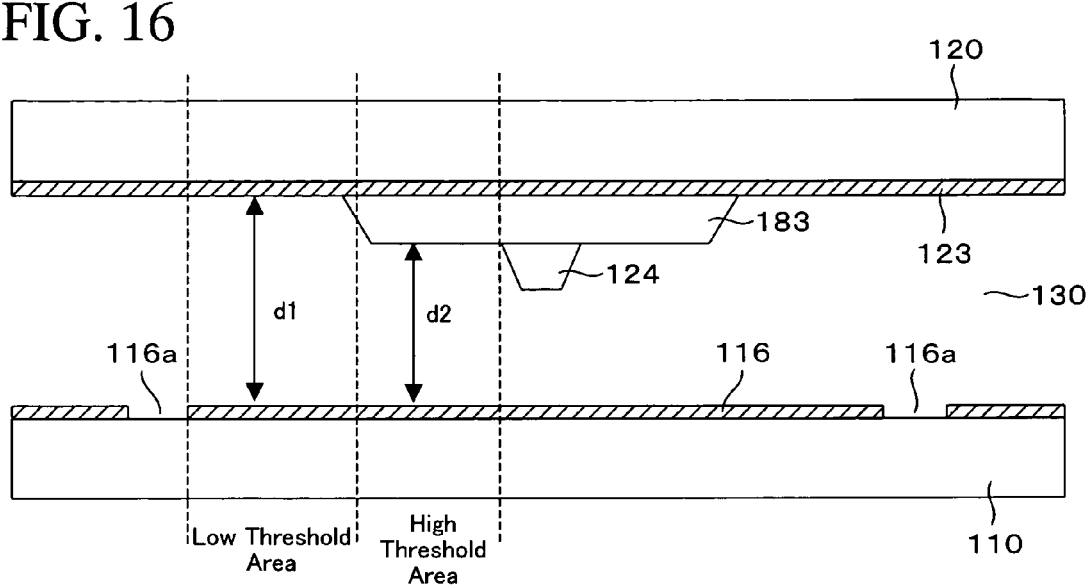
FIG. 16 is a schematic diagram showing a method (third method) of manufacturing a liquid crystal display device of the fifth embodiment of the present invention.

FIG. 16 is a schematic cross-sectional view showing a liquid crystal display device in which a plurality of areas having different T-V characteristics are formed in each picture element by forming a threshold adjustment film 183 between a common electrode 123 and each domain regulation protrusion 124. Referring to this FIG. 16, a method (third method) of manufacturing a liquid crystal display device of the fifth embodiment will be described. Incidentally, in FIG. 16, the same components as those shown in FIG. 4 are denoted by the same reference numerals. Further, in FIG. 16, polarizing plates, alignment control layers, and the like are not shown.

First, two glass substrates 110 and 120 were prepared. Picture element electrodes 116 made of ITO were formed on one glass substrate 110, and a common electrode 123 made of ITO was formed on the other glass substrate 120. In each picture element electrode 116, domain regulation slits 116a having widths of 10 μm are provided.

Next, photoresist was applied to the surface of the glass substrate 120 to form a first photoresist film having a thickness of 1 μm. This first photoresist film was exposed and developed to form threshold adjustment films 183 having widths of 40 μm. Each threshold adjustment film 183 was formed at a position corresponding to the center of the area between the slits 116a of the picture element electrode 116.

Thereafter, photoresist was applied to the surface of the glass substrate 120 to form a second photoresist film. This second photoresist film was exposed and developed to form a domain regulation protrusion 124 having a width of 10 μm and a height of 1.5 μm on each threshold adjustment film 183.

Next, the glass substrates 110 and 120 were adhered to each other in a manner such that spacers (not shown) having diameters of 4 μm were interposed therebetween, and the space between the substrates 110 and 120 was filled with liquid crystal to which reactive monomers having the capability of controlling the alignment of liquid crystals were added.

Subsequently, ultraviolet light was applied to the liquid crystal panel containing the liquid crystal from the substrate 120 side to polymerize the monomers, thus forming alignment control layers (not shown) on the surfaces of the substrates 110 and 120 which face a liquid crystal layer 130.

The liquid crystal panel prepared as described above was interposed between two polarizing plates, and driven by a driving circuit. Then, the state of display was investigated. As a result, it has been confirmed that discolor can be suppressed.

MANUFACTURING EXAMPLE 4

Figure 17:
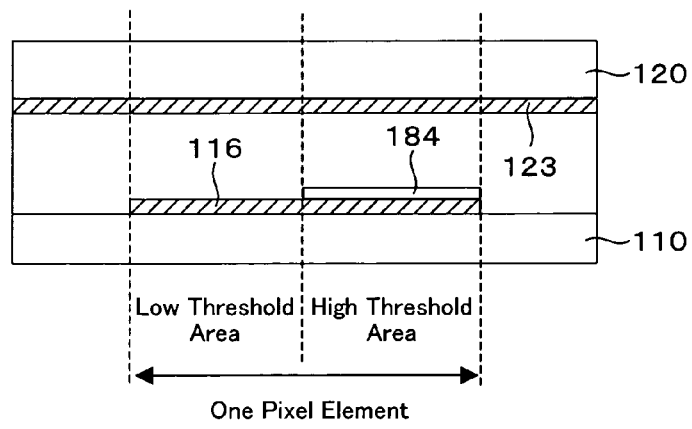
FIG. 17 is a schematic diagram showing a method (fourth method) of manufacturing a liquid crystal display device of the fifth embodiment of the present invention.

FIG. 17 is a schematic cross-sectional view showing a liquid crystal display device, wherein a resin film adding a reaction initiator is partially formed within each picture element area. Referring to this FIG. 17, a method (fourth method) of manufacturing a liquid crystal display device of the fifth embodiment will be described. Incidentally, in FIG. 17, the same components as those shown in FIG. 4 are denoted by the same reference numerals. Further, in FIG. 17, polarizing plates, alignment control layers, and the like are not shown.

First, two glass substrates 110 and 120 were prepared. Picture element electrodes 116 made of ITO were formed on one glass substrate 110, and a common electrode 123 made of ITO was formed on the other glass substrate 120.

Next, resin (polyimide) to which IRG-184 (manufactured by Ciba Specialty Chemicals Corp.) was added at 0.5% as an initiator, was selectively applied to the surfaces of the picture element electrodes 116, thus forming resin films 184 having thicknesses of 0.1 μm in areas each of which was equivalent to 50% of one picture element area.

Thereafter, the glass substrates 110 and 120 were adhered to each other in a manner such that spacers (not shown) having diameters of 4 μm were interposed therebetween, thus preparing an empty cell. Then, this empty cell was filled with liquid crystal (liquid crystal with negative dielectric anisotropy) to which reactive monomers were added.

Subsequently, ultraviolet light was applied to the liquid crystal panel containing the liquid crystal from the substrate 120 side to polymerize the monomers, thus forming alignment control layers (not shown) on the surfaces of the substrates 110 and 120 which face a liquid crystal layer 130.

The liquid crystal panel prepared as described above was interposed between two polarizing plates, and driven by a driving circuit. Then, the state of display was investigated. As a result, it has been confirmed that discolor can be suppressed, and that there are differences in T-V characteristic between the areas having the resin films 184 and the areas having no resin films.

(6) Sixth Embodiment

Hereinafter, a sixth embodiment of the present invention will be described. In the present embodiment, reactive monomers (resin) having the capability of controlling alignment are added to liquid crystal, and light is applied thereto in a later step to polymerize the reactive monomers, thus forming alignment control layers on the surfaces of substrates. At this time, for example, the anchoring energies of the alignment control layers to liquid crystal molecules are changed within a partial area of each picture element by controlling conditions for applying the light, thus forming a plurality of areas having different T-V characteristics within each picture element.

Figure 18A:
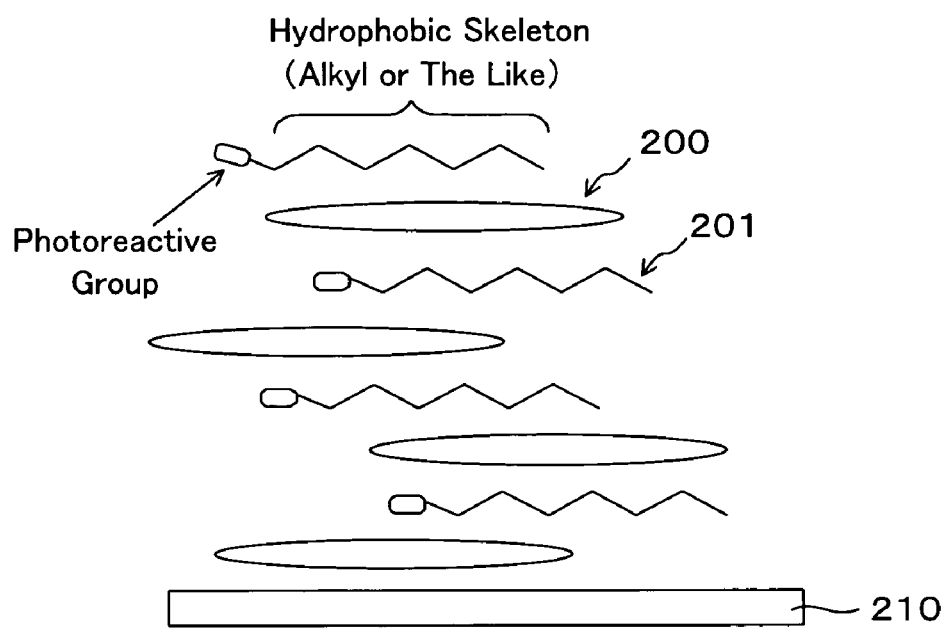
FIGS. 18A and 18B are schematic diagrams showing the formation of an alignment control layer.
Figure 18B:
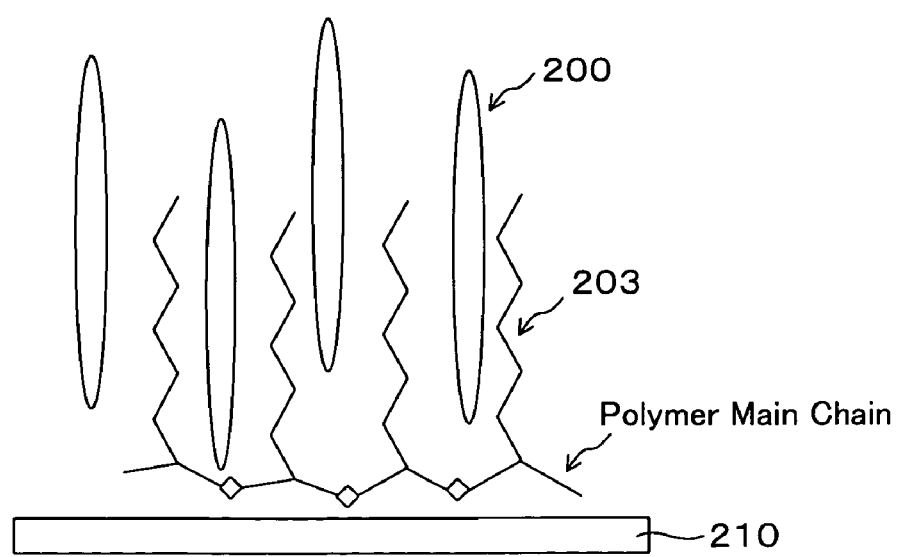

FIGS. 18A and 18B are schematic diagrams showing the formation of an alignment control layer. Reactive monomers 201 used for the formation of the alignment control layer have a photoreactive group on one side of a hydrophobic skeleton. A typical molecular structure capable of controlling the alignment direction of liquid crystal molecules 200 is an alkyl chain. Moreover, a photoreactive group means a skeleton which has an unsaturated double bond, such as an acrylate group, a metacrylate group, an acrylic group or the like, and which can polymerize with other molecules by applying light or the like.

As shown in FIG. 18A, the liquid crystal molecules 200 immediately after liquid crystal has been injected are aligned parallel to the surface of the substrate 210. When light is applied, the reactive monomers polymerize as shown in FIG. 18B to form an alignment control layer 203 for aligning the liquid crystal molecules 200 with the direction perpendicular to the surface of the substrate 210.

With polymer dispersed liquid crystals (PDLCs) heretofore known, polymers are formed over the entire thickness of a liquid crystal layer. On the other hand, in the present embodiment, a thin layer (i.e., the alignment control layer 203) made of resin is formed only on the surface of the substrate 210. In the case where polymers are formed by polymerizing only monofunctional monomers, each polymer main chain has a series structure as shown in FIG. 18B. In the alignment control layer 203, polymer main chains are deposited and intertwined with each other.

Figure 19A:
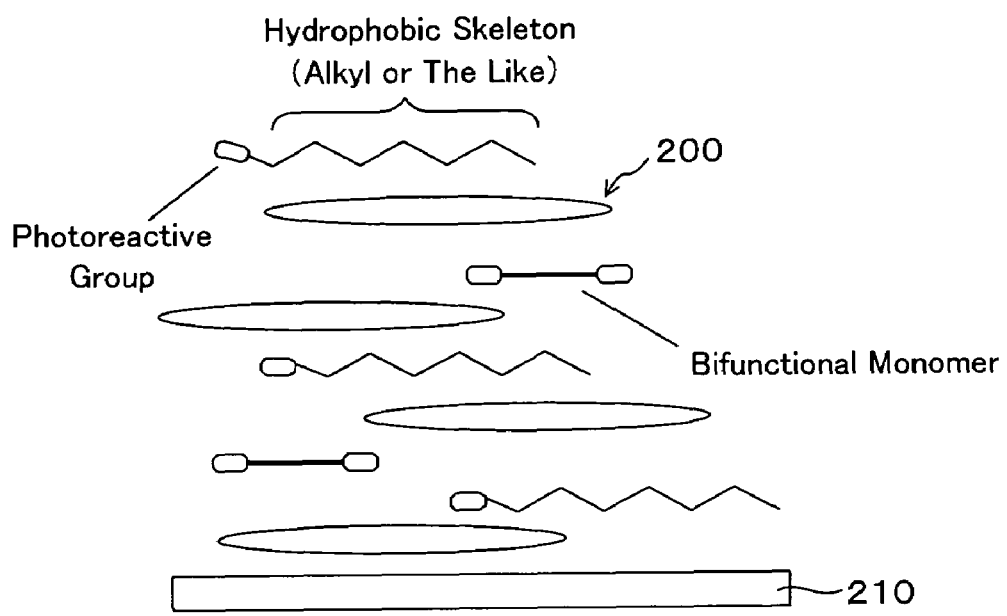
FIGS. 19A and 19B are schematic diagrams showing the formation of an alignment control layer in which monofunctional and bifunctional monomers are used.
Figure 19B:
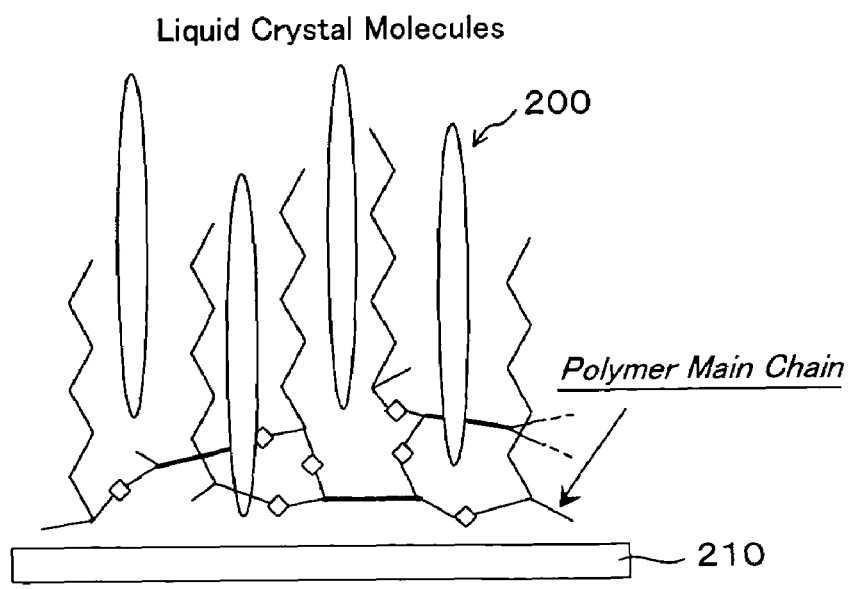

FIGS. 19A and 19B are schematic diagrams showing the formation of an alignment control layer in which monofunctional and bifunctional monomers are used. In the case where not only monofunctional monomers but also monomers each having two or more functional groups are used as shown in FIG. 19A, polymer main chains are formed with chemically three-dimensional mesh shape as shown in FIG. 19B. Thus, by adding monomers each having two or more functional groups, a rigid and reliable alignment control layer can be obtained compared to an alignment control layer made of only monofunctional monomers.

In order to form a plurality of areas having different T-V characteristics within each picture element, it can be considered that initial tilt angles of liquid crystal molecules in part of each picture element are changed by using the technology to specify the tilt directions of liquid crystal molecules by polymerizing a polymerization component added to the liquid crystal, for example, as described in Laid-open Japanese Unexamined Patent Publication No. 2002-357830. However, in order to sufficiently change T-V characteristic, the initial tilt angles of the liquid crystal molecules need to be increased. Increasing the initial tilt angles of the liquid crystal molecules newly causes a problem that light leakage occurs at the time of full black display to lower a contrast ratio.

Experiments and research of the inventors of the present application has revealed that the anchoring energies received by liquid crystal molecules are changed by changing conditions of the wavelength of light, illuminance thereof, and the like when an alignment control layer is formed by applying light to reactive monomers added to the liquid crystal. Since thresholds of T-V characteristics relates to the anchoring energies, a plurality of areas having different T-V characteristics can be formed within each picture element by applying light to the plurality of areas within each picture element under respective different conditions. This makes it possible to suppress the phenomenon (discolor) in which a screen looks whitish when it is viewed from an oblique direction. Moreover, since the liquid crystal molecules align with the direction perpendicular to the surfaces of the substrates when a voltage is not applied, the lowering in contrast can also be avoided.

The anchoring energies received by the liquid crystal molecules can also be changed by surface treatment, such as rubbing treatment in which the surfaces of substrates are rubbed by a roller wound with a cloth or the like, plasma treatment in which the surfaces of substrates are exposed to a plasma atmosphere, or excimer UV treatment in which excimer UV light is applied to the surfaces of substrates, before the liquid crystal is injected into the panel. Moreover, in the case where alignment control layers are formed by polymerizing monomers while applying a voltage to a liquid crystal panel, the anchoring energies received by liquid crystal molecules also changes in accordance with the voltage. Furthermore, the anchoring energies received by liquid crystal molecules also changes depending on the irradiation angle of UV light when monomers are polymerized.

Incidentally, in Laid-open Japanese Unexamined Patent Publication No. 2000-214443 and No. 2001-66583, the following is described: after with compatible liquid of liquid crystals and polymer precursors has been filled the space between a pair of substrates, ultraviolet light is selectively applied thereto to form two areas having different grain sizes of liquid crystal droplets within each picture element, whereby T-V characteristics in the two areas are made to differ from each other. However, this technology is different from that of the invention of the present application in which the anchoring energies of alignment control layers to liquid crystal molecules are controlled. Even if residual monomers exist in liquid crystal, it does not show optical electrical characteristics of light scattering like the above-described technology.

Moreover, in a liquid crystal display device of a type in which the tilt directions of liquid crystal molecules are specified by solidifying monomers added to the liquid crystal, the directions in which the liquid crystal molecules are tilted are determined by growing polymers in a fixed direction in the liquid crystal. In this case, alignment films for aligning the liquid crystal molecules with the direction perpendicular to the surfaces of substrates need to be previously formed on the surfaces of the substrates. This case is different from the case of the liquid crystal display device of the present embodiment in which alignment control layers for vertically aligning liquid crystal molecules are formed by polymerizing monomers added to the liquid crystal.

Figure 20A:
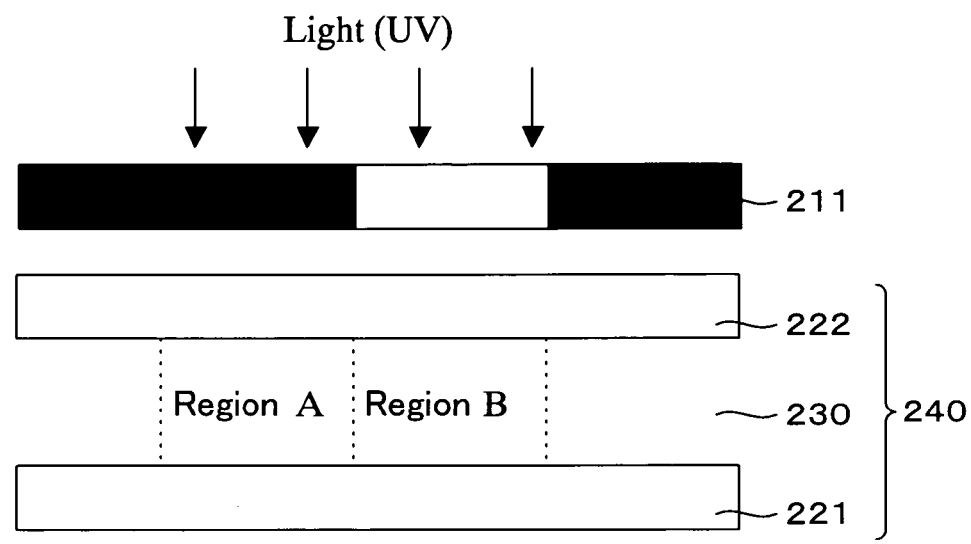
FIGS. 20A and 20B are schematic diagrams showing a method of manufacturing a liquid crystal display device of a sixth embodiment of the present invention.
Figure 20B:
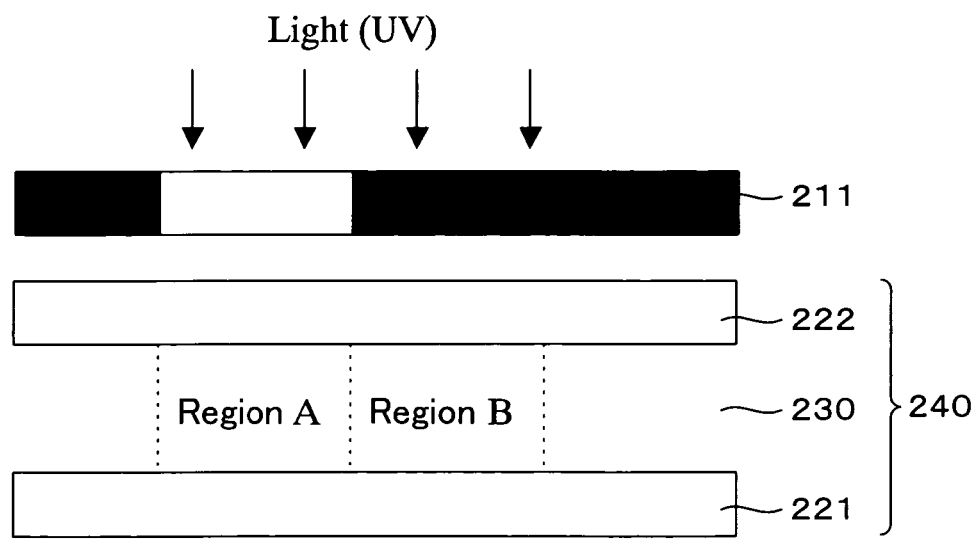

FIGS. 20A and 20B are schematic diagrams showing a method of manufacturing a liquid crystal display device in which a plurality of areas having different T-V characteristics are formed within each picture element by changing the illuminance of light. Here, it is assumed that two areas (areas A and B) having different T-V characteristics are formed within each picture element.

First, similar to the case of the first embodiment, TFT and opposing substrates are prepared. However, in the present embodiment, since a plurality of areas having different T-V characteristics are formed by controlling irradiation conditions of light when alignment control layers are formed, partial alignment films (polyimide films 117 and 127 shown in FIG. 4) need not be formed.

Thereafter, with liquid crystal (liquid crystal with negative dielectric anisotropy) to which reactive monomers are added is filled the space between the TFT and opposing substrates, thus preparing a liquid crystal panel.

Next, as shown in FIG. 20A, using an exposure mask 211 for shading a portion except one area (area B) within each picture element, ultraviolet light is applied to the liquid crystal panel 240, for example, under conditions of 2 mW/cm$^2$. Thus, the reactive monomers in the portions of areas B polymerize, whereby alignment control layers are formed on the surfaces of the substrates (surfaces of the TFT and opposing substrates 221 and 222 which face a liquid crystal layer 230) in areas B.

Thereafter, as shown in FIG. 20B, using an exposure mask 212 for shading a portion except the other area (area A) within each picture element, ultraviolet light is applied to the liquid crystal panel 240, for example, under conditions of 0.5 mW/cm$^2$. Thus, the reactive monomers in the portions of areas A polymerize, and alignment control layers are also formed on the surfaces of the substrates (surfaces of the TFT and opposing substrates 221 and 222 which face the liquid crystal layer 230) in areas A. However, in the alignment control layers formed on the area A side, the anchoring energies received by the liquid crystal molecules are small compared to the case of the alignment control layer on the area B side.

Incidentally, in order to polymerize the above-described reactive monomers added to the liquid crystal, light with a wavelength of 300 nm to 400 nm is applied. If the illuminance (accumulated illuminance) of light with this wavelength is lower than 0.001 mW/cm$^2$, irradiation time becomes too long, and this is not practical. On the other hand, if the illuminance of light with the above-described wavelength exceeds 100 mW/cm$^2$, the liquid crystal may be broken, and this makes reliability to be significantly deteriorated. Accordingly, when the reactive monomers are polymerized, it is preferred that light be applied under conditions where the accumulated illuminance of light with a wavelength of 300 nm to 400 nm is 0.001 mW/cm to 100 mW/cm$^2$.

Figure 21:
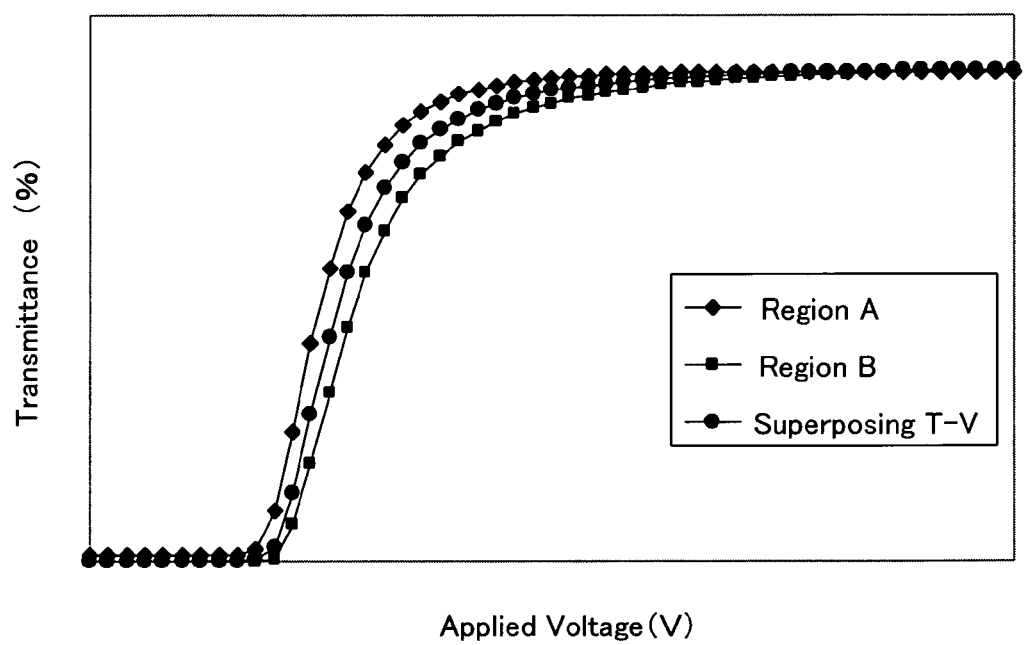
FIG. 21 is a view showing T-V characteristic in area A, that in area B, and that obtained by superposing the foregoing in one picture element of the liquid crystal display device of the sixth embodiment.

FIG. 21 is a view showing T-V characteristic in area A, T-V characteristic in area B, and T-V characteristic obtained by superposing the foregoing. Here, the horizontal axis represents the applied voltage, and the vertical axis represents the transmittance. T-V characteristic of each picture element are obtained by superposing (averaging) T-V characteristic in area A and that in area B. This reduces the difference between T-V characteristic when a screen is viewed from the front thereof and that when the screen is viewed from an oblique direction, and suppresses the phenomenon (discolor) in which the screen looks whitish when viewed from an oblique direction.

Instead of adjusting irradiation amount, the wavelength of ultraviolet light may be adjusted. For example, in the case where ultraviolet light with a wavelength of 313 nm is applied to areas A under conditions of 1 mW/cm$^2$ and in the case where ultraviolet light with a wavelength of 365 nm is applied to areas B under conditions of 1 mW/cm$^2$, a similar effect can be obtained.

Figure 22A:
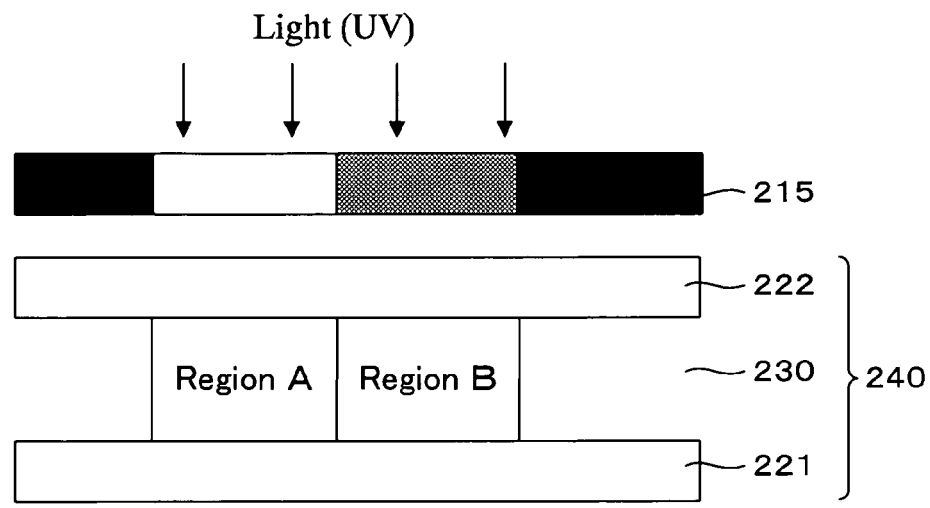
FIGS. 22A and 22B are schematic views (first example) showing a modification of the method of manufacturing a liquid crystal display device of the sixth embodiment.
Figure 22B:
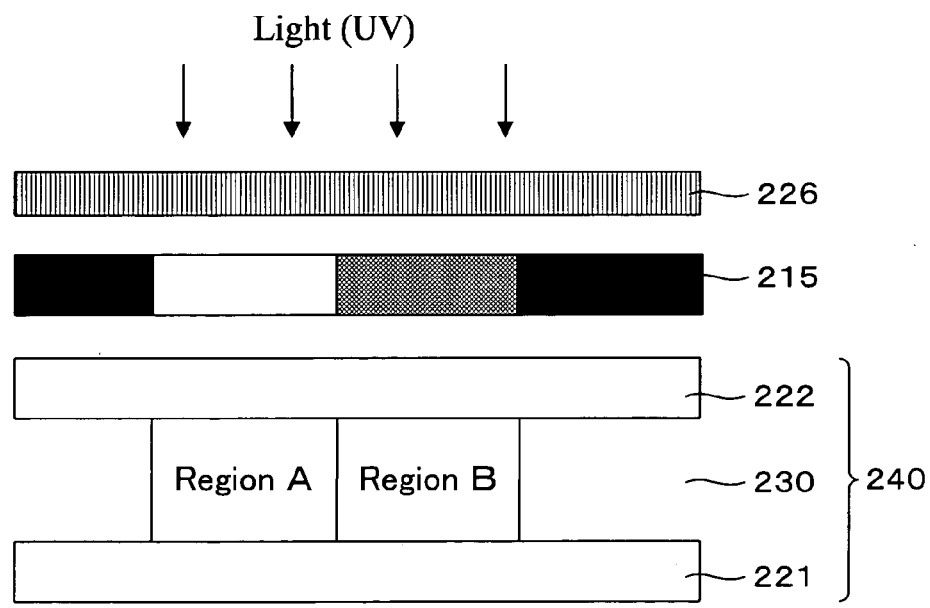

In the case of employment of an exposure mask 215 in which light transmittances are different from each other between each portion corresponding to area A and each portion corresponding to area B as shown in FIG. 22A, one exposure can bring formation of two areas having different anchoring energies. Further, FIG. 22B shows an example in which ultraviolet light is applied using an optical band-pass filter 216 and the above-described exposure mask 215 in combination.

Figure 23A:
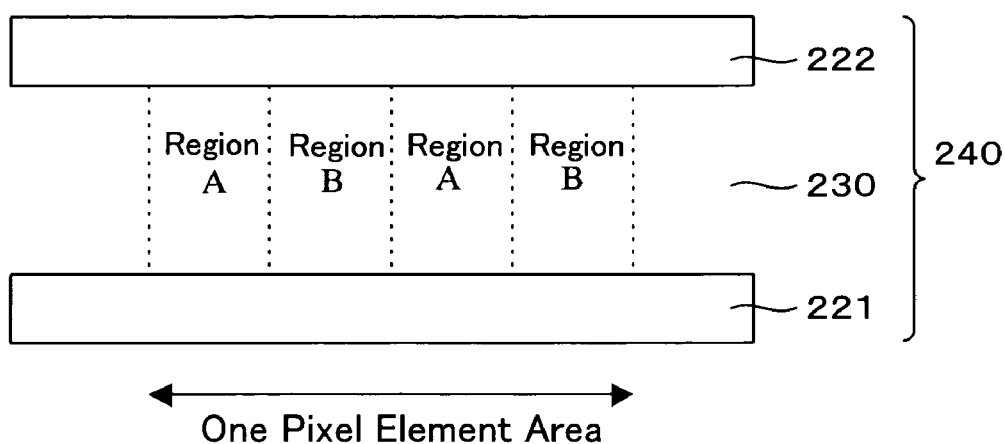
FIGS. 23A and 23B are schematic views (second example) showing a modification of the method of manufacturing a liquid crystal display device of the sixth embodiment.
Figure 23B:
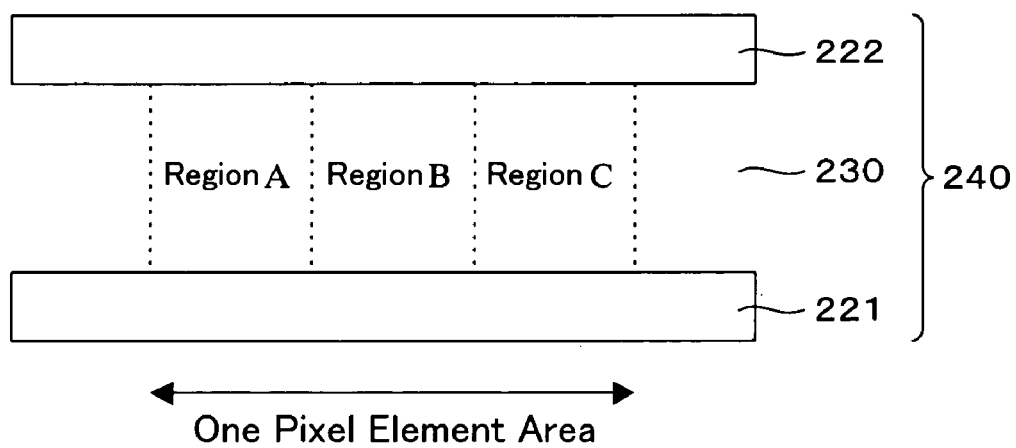

As shown in FIG. 23A, a plurality of areas A and a plurality of areas B may be provided within each picture element. Moreover, there may be three or more areas having different anchoring energies. FIG. 23B shows an example in which three areas (areas A, B, and C) having different anchoring energies are formed.

Hereinafter, manufacturing examples of liquid crystal display devices of the present embodiment will be described.

MANUFACTURING EXAMPLE 1

First, preparation brought a pair of glass substrates being subject to formation of ITO films thereon. Then, one glass substrate was subject thereon to scattering of spacers (manufactured by Sekisui Chemical Co., Ltd.) having diameters 4.25 μm, and the other glass substrate was subject thereon to coating of heat-curing seal material (manufactured by Mitsui Toatsu Chemicals Inc.) by a dispenser. These glass substrates were adhered to each other, thus preparing an empty cell.

Next, the empty cell was subject therein to injection of liquid crystal adding monofunctional and bifunctional monomers by vacuum injection, followed by sealing a liquid crystal inlet with visible light-curing resin. The monofunctional monomers were used specifying ones each having an acrylate group on an alkyl chain having 11 to 18 CH$_2$. Further, the bifunctional monomers were used specifying ones of the diacrylate series which have ring structures. The liquid crystal was used specifying one (negative liquid crystal) manufactured by Merck Ltd. which has negative dielectric anisotropy. The amount of the monofunctional monomers added to the liquid crystal is 2 wt %, and that of the bifunctional monomers is 0.3 wt %.

Thereafter, using two kinds of exposure masks as shown in FIGS. 20A and 20B, ultraviolet light was applied to one area (area B) in each picture element so that the illuminance becomes 2 mW/cm$^2$, and ultraviolet light was applied to the other area (area A) in each picture element so that the illuminance becomes 0.5 mW/cm$^2$, thus forming alignment control layers on the surfaces of the substrates. Note that each of areas A and B is a stripe-shaped area having a width of 20 μm.

The liquid crystal panel prepared as described above was interposed between two polarizing plates (λ/4 plates), and driven by a driving circuit. Then, the state of display was investigated. As a result, it has been confirmed that discolor is suppressed.

MANUFACTURING EXAMPLE 2

Manufacturing, same as in the case of Manufacturing Example 1, was performed to bring a liquid crystal panel enclosing, between a pair of glass substrates, liquid crystal containing monofunctional and bifunctional monomers.

Thereafter, using the exposure mask shown in FIG. 20A and an optical band-pass filter in which the central wavelength of transmitted light was 313 nm, ultraviolet light was applied to one area (area B) in each picture element so that the illuminance becomes 1 mW/cm$^2$. Moreover, using the exposure mask shown in FIG. 20B and an optical band-pass filter in which the central wavelength of transmitted light was 365 nm, ultraviolet light was applied to the other area (area A) in each picture element so that the illuminance becomes 1 mW/cm$^2$. These ultraviolet light irradiations allowed alignment control layers to be formed on the surfaces of the glass substrates. Note that each of areas A and B is a stripe-shaped area having a width of 20 μm.

The liquid crystal panel prepared as described above was interposed between two polarizing plates (λ/4 plates), and driven by a driving circuit. Then, the state of display was investigated. As a result, it has been confirmed that discolor is suppressed.

MANUFACTURING EXAMPLE 3

Using an exposure mask as shown in FIG. 20B, light outputted from an excimer UV apparatus was applied to only areas A (stripe-shaped areas having widths of 20 μm) on the surfaces of glass substrates on which ITO films were formed. Subsequent manufacturing, same as in the case of Manufacturing Example 1, was performed to bring a liquid crystal panel enclosing, between a pair of glass substrates, liquid crystal containing monofunctional and bifunctional monomers.

Thereafter, ultraviolet light was applied to the entire surface of the liquid crystal panel, thus forming alignment control layers on the surfaces of the glass substrates. In this case, in areas A to which excimer UV was applied, the anchoring energy becomes high compared to that in areas B to which excimer UV was not applied.

The liquid crystal panel prepared as described above was interposed between two polarizing plates (λ/4 plates), and driven by a driving circuit. Then, the state of display was investigated. As a result, it has been confirmed that discolor is suppressed.

MANUFACTURING EXAMPLE 4

Manufacturing, similar to Manufacturing Example 1, was performed to bring a liquid crystal panel enclosing, between a pair of glass substrates, liquid crystal containing monofunctional and bifunctional monomers.

Next, while a voltage was being applied to electrodes, ultraviolet light was applied to areas A using an exposure mask as shown in FIG. 20B. Then, in the state where a voltage was not applied, ultraviolet light was applied to areas B using an exposure mask as shown in FIG. 20A.

The liquid crystal panel prepared as described above was interposed between two polarizing plates (λ/4 plates), and driven by a driving circuit. Then, the state of display was investigated. As a result, it has been confirmed that discolor is suppressed.

Note that, even in the case that the application of ultraviolet light to areas A is performed by a voltage different from that applied when ultraviolet light is applied to areas B, a similar effect can be obtained.

MANUFACTURING EXAMPLE 5

Manufacturing, same as in the case of Manufacturing Example 1, was performed to bring a liquid crystal panel enclosing, between a pair of glass substrates, liquid crystal to which monofunctional and bifunctional monomers were added.

Thereafter, ultraviolet light was applied to areas A from an oblique direction to the liquid crystal panel using a mask as shown in FIG. 20B, and ultraviolet light was applied to areas B from a direction perpendicular to the liquid crystal panel using a mask as shown in FIG. 20A, thus forming alignment control layers on the surfaces of the glass substrates. Note that each of areas A and B is a stripe-shaped area having a width of 20 μm.

The liquid crystal panel prepared as described above was interposed between two polarizing plates (λ/4 plates), and driven by a driving circuit. Then, the state of display was investigated. As a result, it has been confirmed that discolor is suppressed.

Seventh Embodiment

Hereinafter, a seventh embodiment of the present invention will be described.

In the present embodiment, it is assumed that, in a film formed on a substrate, the states between a plurality of areas within picture element are different from each other. Accordingly, the doses of ultraviolet light passing through the film are different from each other between the areas, and the polymerization states of a polymerization component added to liquid crystal are different from each other between the areas within each picture element. As a result, a plurality of areas having different T-V characteristics are formed within each picture element, and thus it is possible to suppress the phenomenon (discolor) in which a screen looks whitish when viewed from an oblique direction.

Figure 24A:
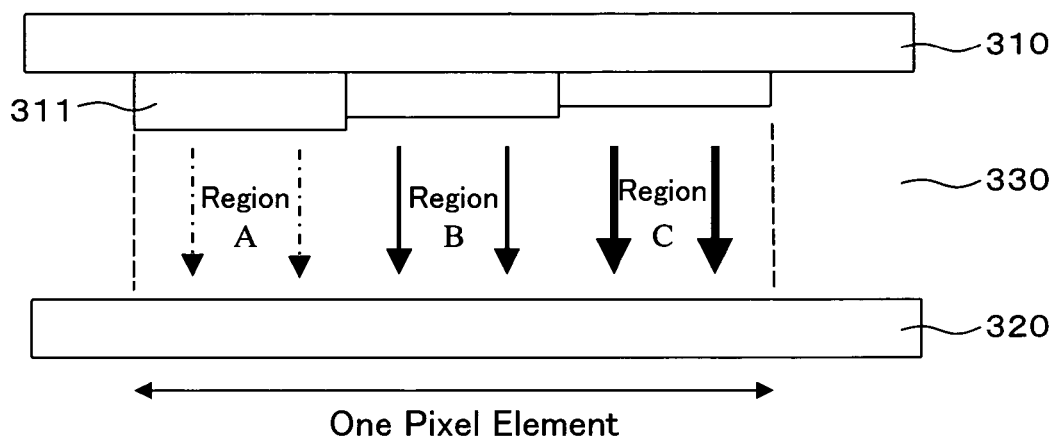
FIGS. 24A and 24B are schematic views (first example) showing a method of manufacturing a liquid crystal display device of a seventh embodiment of the present invention.

For example, FIG. 24A is a schematic diagram of a liquid crystal display device of the present embodiment. This liquid crystal display device is constructed by filling the space between a pair of substrates 310 and 320 with liquid crystal 330 to which a polymerization component is added. As shown in this FIG. 24A, each picture element is divided into, for example, three areas (areas A, B, and C), and the thickness of an ITO film 311 (picture element electrode or opposing electrode) is changed for each area. Since ultraviolet light is absorbed by an amount according to the thickness of the ITO film 311 when the ultraviolet light passes through the ITO film 311, the polymerization state of a polymerization component differs among areas A, B, and C. As a result, T-V characteristics in areas A, B, and C are different from each other.

Figure 24B:
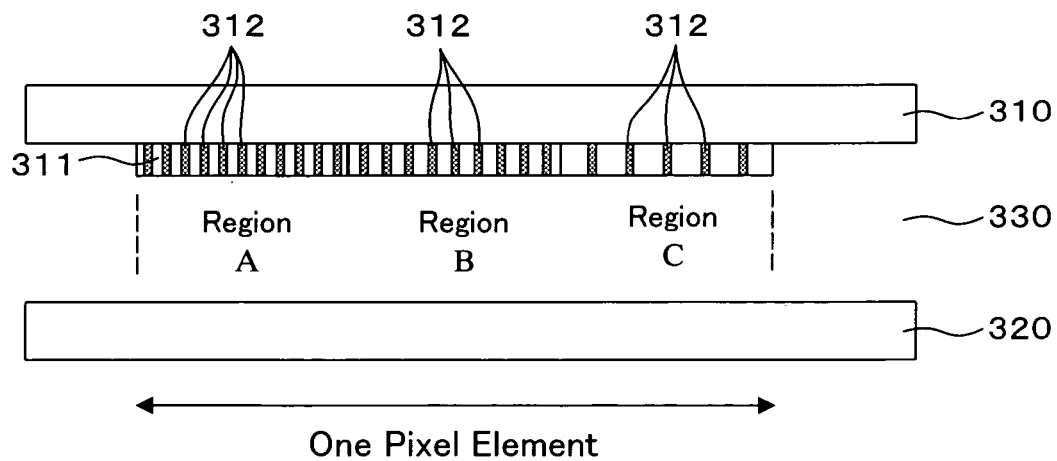

Moreover, as shown in the schematic diagram of FIG. 24B, in the case where the thicknesses of the ITO film 311 in three areas A, B, and C in each picture element are the same and where small holes (or slits) 312 are provided at respective different densities for areas A, B, and C, the absorbed amount of ultraviolet light can also be controlled. In this way, the polymerization state of a polymerization component can be made to differ among areas A, B, and C, and thus T-V characteristics in areas A, B, and C become different from each other.

Figure 25:
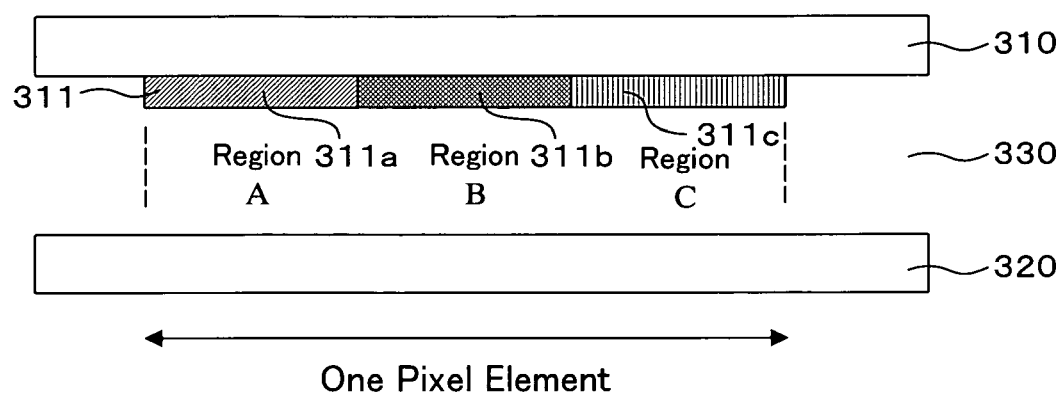
FIG. 25 is a schematic view (second example) showing a method of manufacturing a liquid crystal display device of the seventh embodiment of the present invention.

A similar effect can also be obtained by laser annealing the ITO films in areas A, B, and C under respective different conditions to change the crystallinities of the ITO films 311$a$, 311$b$, and 311$c$ in areas A, B, and C as shown in the schematic diagram of FIG. 25.

Moreover, the state of a film other than an ITO film may be changed within each picture element. For example, a plurality of areas in which the absorbed amounts of light are different from each other are formed within each picture element by changing the state (thickness, the density of holes or slits, crystallinity, or the like) of an insulating film formed between a substrate and an ITO film or an insulating film formed on an ITO film.

The present embodiment can be applied to any of an alignment-film-less liquid crystal display device and a liquid crystal display device of a type in which the tilt directions of liquid crystal molecules are specified by solidifying monomers added to liquid crystal.

Hereinafter, description will be made for manufacturing examples in which liquid crystal display devices were manufactured in accordance with the present embodiment and in which the display characteristics thereof were investigated.

MANUFACTURING EXAMPLE 1

First, two glass substrates (first and second substrates) were prepared. Then, a picture element electrode made of ITO was formed on the first substrate, and a common electrode made of ITO was formed on the second substrate. The thicknesses of the picture element electrode and the common electrode were set to 100 nm.

Next, a resist film covering an area which was equivalent to 50% of a picture element was formed on the common electrode. Then, using this resist film as a mask, the common electrode was etched to have a film thickness of 15,000 nm. Thereafter, the resist film was removed.

Subsequently, vertical alignment films were formed out of vertical alignment material (manufactured by JSR Corporation) on the picture element electrode and the common electrode. Thereafter, one substrate was subject thereon to scattering of spacers (manufactured by Sekisui Chemical Co., Ltd.) having diameters of 4 μm, and the other substrate was subject thereon to application of heat-curing seal material (manufactured by Mitsui Toatsu Chemicals Inc.) by a dispenser. Then, these substrates were adhered to each other to prepare an empty cell.

Thereafter, the empty cell was subject therein to injection of liquid crystal (manufactured by Merck Ltd.) to which bifunctional monomers into by vacuum injection, and then a liquid crystal inlet was sealed with visible light-curing resin. Note that the dielectric anisotropy ($\Delta\in$) of the liquid crystal is −3.8.

Subsequently, while a direct-current voltage of 5 V was being applied to the picture element electrode and the common electrode, ultraviolet light was applied to the entire surface of the panel at an intensity of 10 mW/cm$^2$ in a way such that the irradiation energy was 9,000 mJ/cm$^2$, whereby polymers for determining the tilt directions of the liquid crystal molecules were formed in a liquid crystal layer.

The liquid crystal panel prepared as described above was interposed between two polarizing plates, and driven by a driving circuit. Then, the state of display was investigated. As a result, it has been confirmed that discolor can be suppressed, and that T-V characteristics are different between two areas within each picture element.

MANUFACTURING EXAMPLE 2

An empty cell was formed similarly to Manufacturing Example 1, except for the fact that alignment films were not formed on substrates. Thereafter, the empty cell was subject therein to injection, by vacuum injection, of liquid crystal (manufactured by Merck Ltd.) to which a polymerization component was added at a ratio of 2 wt % and of which dielectric anisotropy ($\Delta\in$) was −3.8. The polymerization component was used specifying resin in which monofunctional monomers (dodecyl acrylate: manufactured by Wako Pure Chemical Industries, Ltd.) and bifunctional monomers (manufactured by Merck Ltd.) were mixed at a weight ratio of 15:1.

Subsequently, ultraviolet light was applied to the entire surface of the panel at an intensity of 1 mW/cm$^2$ in a way such that the irradiation energy was 9,000 mJ/cm$^2$ in the state where a voltage was not applied, thus forming vertical alignment films on the surfaces of substrates.

The liquid crystal panel prepared as described above was interposed between two polarizing plates, and driven by a driving circuit. Then, the state of display was investigated. As a result, it has been confirmed that discolor can be suppressed, and that T-V characteristics are different between two areas within each picture element.

Eighth Embodiment

Hereinafter, an eighth embodiment of the present invention will be described.

In a liquid crystal display device manufactured by technology to specify the tilt directions of liquid crystal molecules by solidifying monomers added to the liquid crystal, as the cell thickness (thickness of a liquid crystal layer) increases, the stability of tilt angles of the liquid crystal molecules increases. Accordingly, for example, as shown in FIG. 26, in the case where a plurality of areas A, B, and C having different thicknesses of a liquid crystal layer are formed within each picture element, the thresholds of T-V characteristics in these areas are different from each other.

Figure 26:
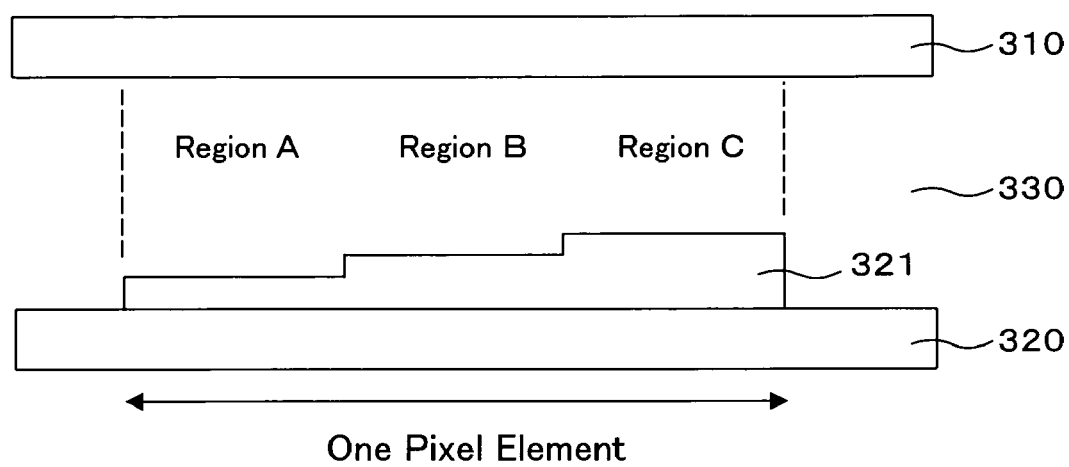
FIG. 26 is a schematic diagram showing a method of manufacturing a liquid crystal display device of an eighth embodiment of the present invention.

FIG. 26 shows a liquid crystal display device in which each picture element is divided into three areas and in which the cell thickness is made to differ among the areas by changing the thickness of a color filter 321 for each area. Instead of the color filter 321, an ITO film or other film may have different thicknesses among the three areas.

Hereinafter, manufacturing examples of the present embodiment will be described.

MANUFACTURING EXAMPLE 1

Figure 27:
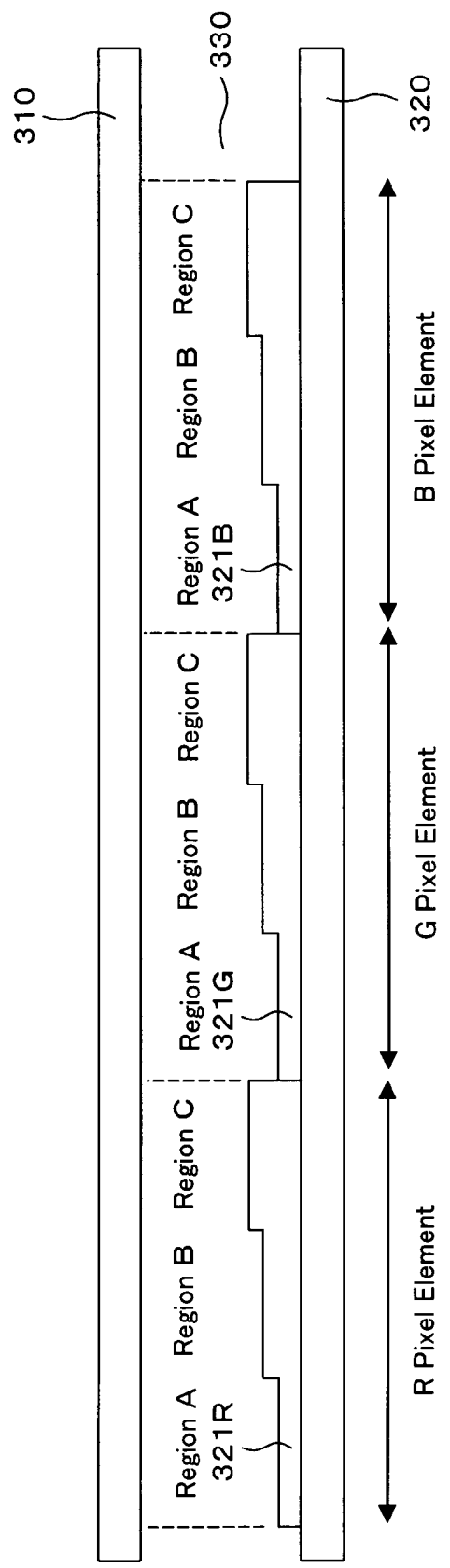
FIG. 27 is a schematic diagram showing a manufacturing example (first example) of a liquid crystal display device of the eighth embodiment.

FIG. 27 is a schematic diagram showing a manufacturing example (first example) of a liquid crystal display device of the eighth embodiment. In this liquid crystal display device, an R (red) picture element is divided into three areas (areas A, B, and C), and the thickness of a red color filter 321R is made to differ among areas A, B, and C. Similarly, a G (green) picture element is divided into three areas (areas A, B, and C), and the thickness of a green color filter 321G is made to differ among areas A, B, and C. Furthermore, a B (blue) picture element is divided into three areas (areas A, B, and C), and the thickness of a blue color filter 321B is made to differ among areas A, B, and C. As a result, the cell thicknesses in areas A, B, and C are different from each other.

Specifically, the thicknesses of the color filters 321R, 321G, and 321B in the respective areas A of the R, G, and B picture elements are the same, the thicknesses of the color filters 321R, 321G, and 321B in the respective areas B are the same, and the thicknesses of the color filters 321R, 321G, and 321B in the respective areas C are the same.

A vertical alignment film (not shown) is formed on these color filters 321R, 321G, and 321B. Then, the space between substrates 310 and 320 is filled with liquid crystal 330 to which a polymerization component is added. Ultraviolet light is applied to the resultant structure in the state where a voltage is applied to electrodes, whereby polymers for specifying the tilt directions of the liquid crystal molecules are formed between the substrates 310 and 320.

By providing a plurality of areas having different cell thicknesses within each picture element in this way, T-V characteristics in areas A, B, and C can be made to differ from each other. As a result, the phenomenon (discolor) in which a screen looks whitish when viewed from an oblique direction is suppressed.

MANUFACTURING EXAMPLE 2

In a color liquid crystal display device, there are cases where the cell thicknesses of R, G, and B picture elements are individually set for the optimization of display performance. Here, an example in which the present invention is applied to such a liquid crystal display device will be described.

Figure 28:
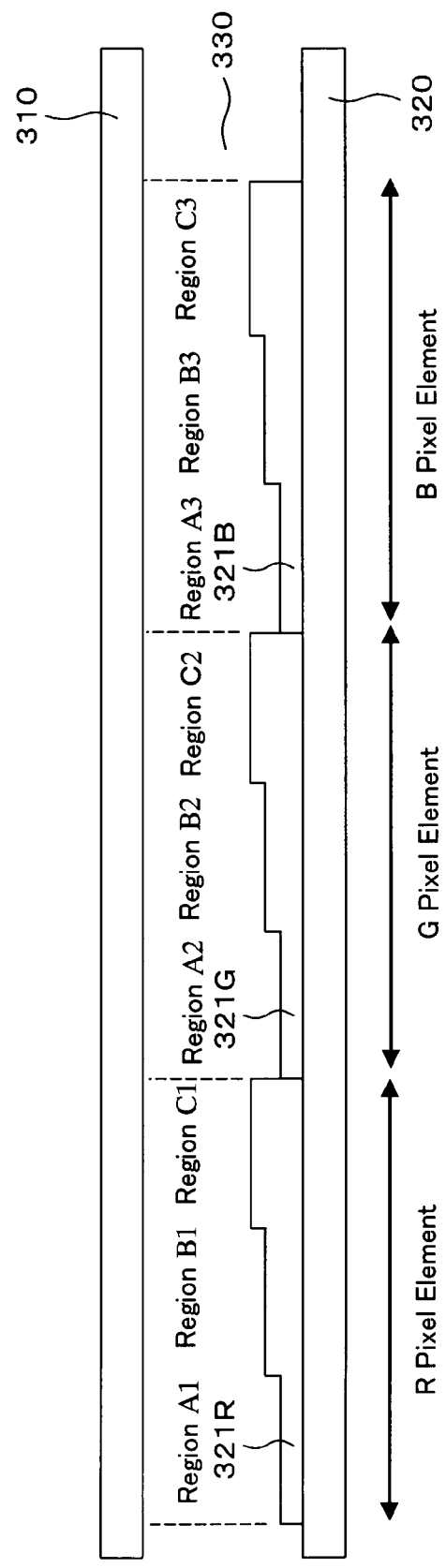
FIG. 28 is a schematic diagram showing a manufacturing example (second example) of a liquid crystal display device of the eighth embodiment.

FIG. 28 is a schematic diagram showing a manufacturing example (second example) of a liquid crystal display device of the eighth embodiment. In this liquid crystal display device, an R picture element is divided into three areas (A1, B1, and C1), and the thickness of a red color filter 321R is made to differ among areas A1, B1, and C1. Moreover, a G picture element is divided into three areas (A2, B2, and C2), and the thickness of a green color filter 321G is made to differ among areas A2, B2, and C2. Furthermore, a B picture element is divided into three areas (A3, B3, and C3), and the thickness of a blue color filter 321B is made to differ among areas A3, B3, and C3. However, unlike Manufacturing Example 1, the thicknesses of the color filters in areas A1, A2, and A3 are not the same, the thicknesses of the color filters in areas B1, B2, and B3 are not the same, and the thicknesses of the color filters in areas C1, C2, and C3 are not the same.

In this example, T-V characteristics in areas A, B, and C can also be made to differ from each other because a plurality of areas having different cell thicknesses are provided within each picture element. As a result, the phenomenon (discolor) in which a screen looks whitish when viewed from an oblique direction is suppressed.

MANUFACTURING EXAMPLE 3

Figure 29:
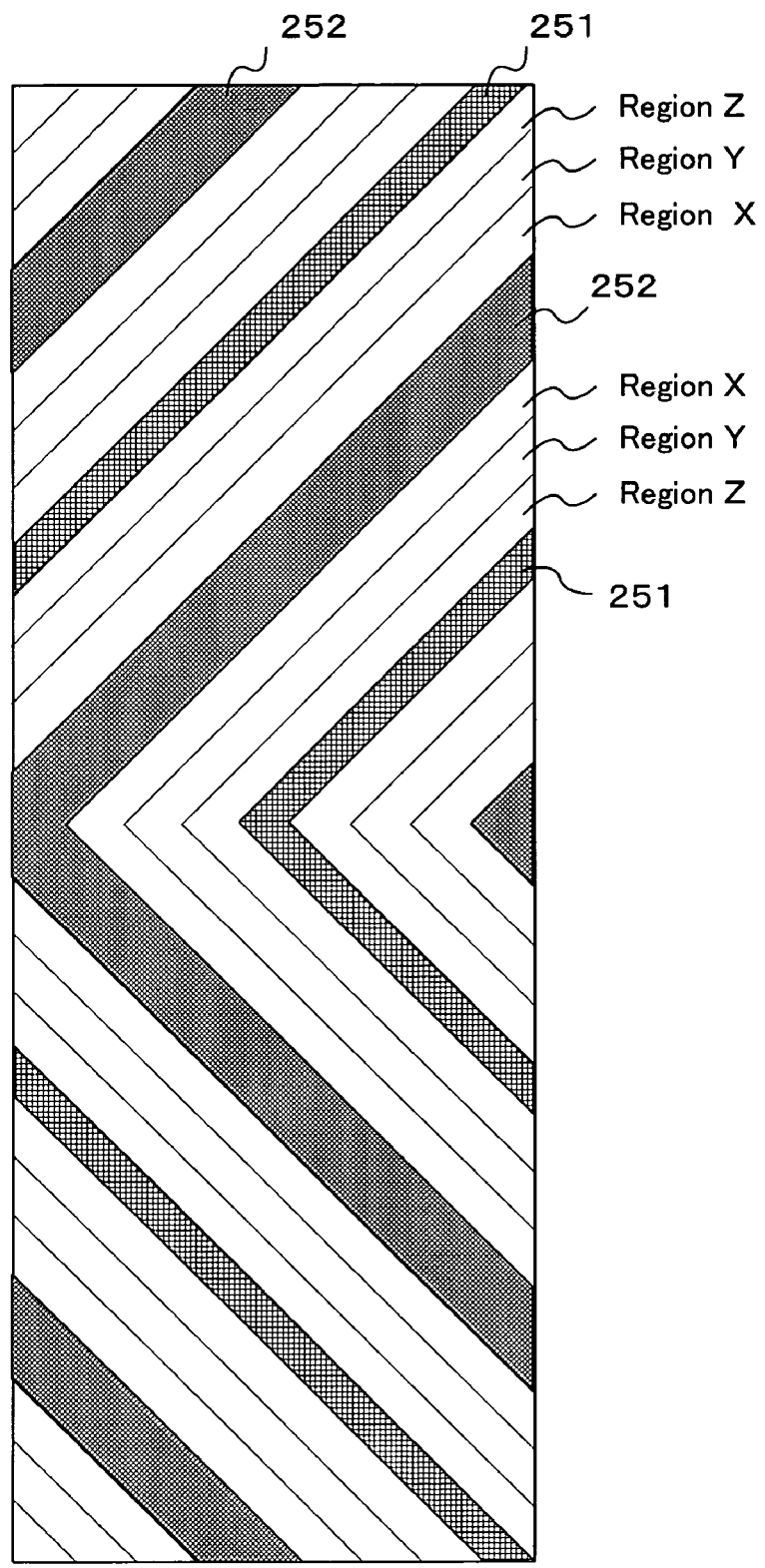
FIG. 29 is a schematic diagram showing a manufacturing example (third example) of a liquid crystal display device of the eighth embodiment.

FIG. 29 is a schematic diagram showing a manufacturing example (third example) of a liquid crystal display device of the eighth embodiment. This FIG. 29 shows one picture element.

In this liquid crystal display device, three areas X, Y, and Z having different cell thicknesses are provided parallel to protrusions 251 and slits (slits of a picture element electrode) 252 which are intended to realize multi-domain.

As in the case of Manufacturing Example 1, the thicknesses of a color filter in areas X, Y, and Z are different from each other. As a result, the cell thicknesses in areas X, Y, and Z are different from each other.

In this manufacturing example, T-V characteristics in areas X, Y, and Z can also be made to differ from each other by providing a plurality of areas having different cell thicknesses within each picture element. As a result, the phenomenon (discolor) in which a screen looks whitish when viewed from an oblique direction is suppressed.

Specifically, in each of the above-described embodiments, description has been performed for the case where a polymerization component added to liquid crystal is a monomer. However, a polymerization component may be used specifying oligomers or polymers having the property of being polymerized by applying light thereto.

What is claimed is:

1. A liquid crystal display device comprising:
   first and second substrates placed to be opposed to each other;
   liquid crystal filling a space between the first and second substrates;
   a plurality of picture element electrodes for controlling tilt angles of liquid crystal molecules in accordance with applied voltages for respective picture element areas, the plurality of picture element electrodes being formed on any one of the first and second substrates; and
   an opposing electrode placed to be opposed to the plurality of picture element electrodes,
   wherein a threshold adjustment dielectric film, which is formed on an entire periphery of the picture element area to open in an area corresponding to the center of the picture element area, is formed for each of the picture element areas on at least one of the first and second substrates, so that thresholds of transmittance-voltage characteristics in peripheries of the picture element areas are higher than those in centers of the picture element areas.

2. The liquid crystal display device according to claim 1, wherein the dielectric film is made of polyimide.

3. The liquid crystal display device according to claim 1, wherein the liquid crystal has negative dielectric anisotropy.

4. The liquid crystal display device according to claim 3, wherein a structure for specifying two or more alignment directions of the liquid crystal molecules within each picture element is provided on at least one of the first and second substrates.

5. The liquid crystal display device according to claim 1, wherein alignment control layers formed by polymerizing a polymerization component added to the liquid crystal are provided on surfaces of the first and second substrates which face the liquid crystal.

* * * * *